(12) United States Patent
Hsu et al.

(10) Patent No.: US 9,244,256 B2
(45) Date of Patent: Jan. 26, 2016

(54) OPTICAL LENS ASSEMBLY, IMAGE CAPTURING DEVICE AND MOBILE TERMINAL

(71) Applicant: LARGAN PRECISION CO., LTD., Taichung (TW)

(72) Inventors: Po-Lun Hsu, Taichung (TW); Lin-Yao Liao, Taichung (TW); Cheng-Chen Lin, Taichung (TW); Wei-Yu Chen, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 174 days.

(21) Appl. No.: 14/199,990

(22) Filed: Mar. 6, 2014

(65) Prior Publication Data

US 2015/0185446 A1 Jul. 2, 2015

(30) Foreign Application Priority Data

Dec. 30, 2013 (TW) .............................. 102149080 A

(51) Int. Cl.
*G02B 3/02* (2006.01)
*G02B 13/18* (2006.01)
*G02B 13/00* (2006.01)

(52) U.S. Cl.
CPC ................. *G02B 13/0045* (2013.01)

(58) Field of Classification Search
CPC ............................ G02B 13/0045; G02B 13/18
USPC .................................................. 359/642–830
See application file for complete search history.

(56) References Cited

U.S. PATENT DOCUMENTS

2014/0139922 A1  5/2014  McLaughlin
2014/0139933 A1  5/2014  Chen et al.

FOREIGN PATENT DOCUMENTS

TW         201310061 A       3/2013

*Primary Examiner* — Mahidere Sahle
(74) *Attorney, Agent, or Firm* — CKC & Partners Co. Ltd.

(57) ABSTRACT

An optical lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element has negative refractive power. The third lens element has refractive power. The fourth lens element with negative refractive power has an object-side surface being concave in a paraxial region thereof and an image-side surface being convex in a paraxial region thereof. The fifth lens element with positive refractive power has an object-side surface being convex in a paraxial region thereof and an image-side surface being concave in a paraxial region thereof, and the image-side surface thereof has at least one convex shape in an off-axial region thereof.

22 Claims, 27 Drawing Sheets

OPTICAL LENS ASSEMBLY, IMAGE CAPTURING DEVICE AND MOBILE TERMINAL

RELATED APPLICATIONS

The application claims priority to Taiwan Application Serial Number 102149080, filed Dec. 30, 2013, which is herein incorporated by reference.

BACKGROUND

1. Technical Field

The present disclosure relates to an optical lens assembly, an image capturing device and a mobile terminal. More particularly, the present disclosure relates to a compact optical lens assembly and an image capturing device applicable to a mobile terminal.

2. Description of Related Art

In recent years, with the popularity of mobile terminals having camera functionalities, the demand of miniaturized optical systems has been increasing. The sensor of a conventional optical system is typically a CCD (Charge-Coupled Device) or a CMOS (Complementary Metal-Oxide-Semiconductor) sensor. As the advanced semiconductor manufacturing technologies have allowed the pixel size of sensors to be reduced and compact optical systems have gradually evolved toward the field of higher megapixels, there is an increasing demand for compact optical systems featuring better image quality.

A conventional optical system employed in a portable electronic product mainly adopts a four-element lens structure. Due to the popularity of mobile terminals with high-end specifications, such as smart phones, tablet personal computers and wearable apparatus, the requirements for high resolution and image quality of present compact optical systems increase significantly. However, the conventional optical systems cannot satisfy these requirements of the compact optical systems.

Other conventional compact optical systems with five-element lens structure enhance image quality and resolution. However, the arrangement of the refractive power of the conventional compact optical systems with five-element lens structure cannot enlarge field of view and maintain enough back focal length at the same time. Therefore, it is difficult to incorporate other optical elements on the back of lens assembly.

SUMMARY

According to one aspect of the present disclosure, an optical lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element has negative refractive power. The third lens element has refractive power. The fourth lens element with negative refractive power has an object-side surface being concave in a paraxial region thereof and an image-side surface being convex in a paraxial region thereof, wherein the object-side surface and the image-side surface of the fourth lens element are aspheric. The fifth lens element with positive refractive power has an object-side surface being convex in a paraxial region thereof and an image-side surface being concave in a paraxial region thereof, wherein the object-side surface and the image-side surface of the fifth lens element are aspheric, and the image-side surface of the fifth lens element has at least one convex shape in an off-axis region thereof. The optical lens assembly has a total of five lens elements with refractive power. When a focal length of the optical lens assembly is f, a focal length of the second lens element is f2, a focal length of the fourth lens element is f4, a focal length of the fifth lens element is f5, a distance in parallel with an optical axis from an axial vertex on an object-side surface of the third lens element to a maximum effective radius position on the object-side surface of the third lens element is SAG31, a distance in parallel with an optical axis from an axial vertex on an image-side surface of the third lens element to a maximum effective radius position on the image-side surface of the third lens element is SAG32, and a central thickness of the third lens element is CT3, the following conditions are satisfied:

$$f2/f5 < -1.2;$$

$$1.50 \le |f/f4| + (f/f5); \text{ and}$$

$$(SAG31+SAG32)CT3 < -0.65.$$

According to another aspect of the present disclosure, an image capturing device includes the optical lens assembly according to the aforementioned aspect and an image sensor, wherein the image sensor is located on the image side of the optical lens assembly.

According to still another aspect of the present disclosure, a mobile terminal includes the image capturing device according to the aforementioned aspect.

According to yet another aspect of the present disclosure, an optical lens assembly includes, in order from an object side to an image side, a first lens element, a second lens element, a third lens element, a fourth lens element and a fifth lens element. The first lens element with positive refractive power has an object-side surface being convex in a paraxial region thereof. The second lens element has negative refractive power. The third lens element has refractive power. The fourth lens element with negative refractive power has an object-side surface being concave in a paraxial region thereof and an image-side surface being convex in a paraxial region thereof, wherein the object-side surface and the image-side surface of the fourth lens element are aspheric. The fifth lens element with positive refractive power has an object-side surface and an image-side surface both being aspheric, wherein at least one of the object-side surface and the image-side surface of the fifth lens element has at least one inflection point in an off-axis region thereof. The optical lens assembly has a total of five lens elements with refractive power. When a focal length of the optical lens assembly is f, a focal length of the second lens element is f2, a focal length of the fourth lens element is f4, and a focal length of the fifth lens element is f5, the following conditions are satisfied:

$$f2/f5 < -3.5; \text{ and}$$

$$1.50 \le |f/f4| + (f/f5).$$

According to still yet another aspect of the present disclosure, an image capturing device includes the optical lens assembly according to the foregoing aspect and an image sensor, wherein the image sensor is located on the image side of the optical lens assembly.

According to a further aspect of the present disclosure, a mobile terminal includes the image capturing device according to the foregoing aspect.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
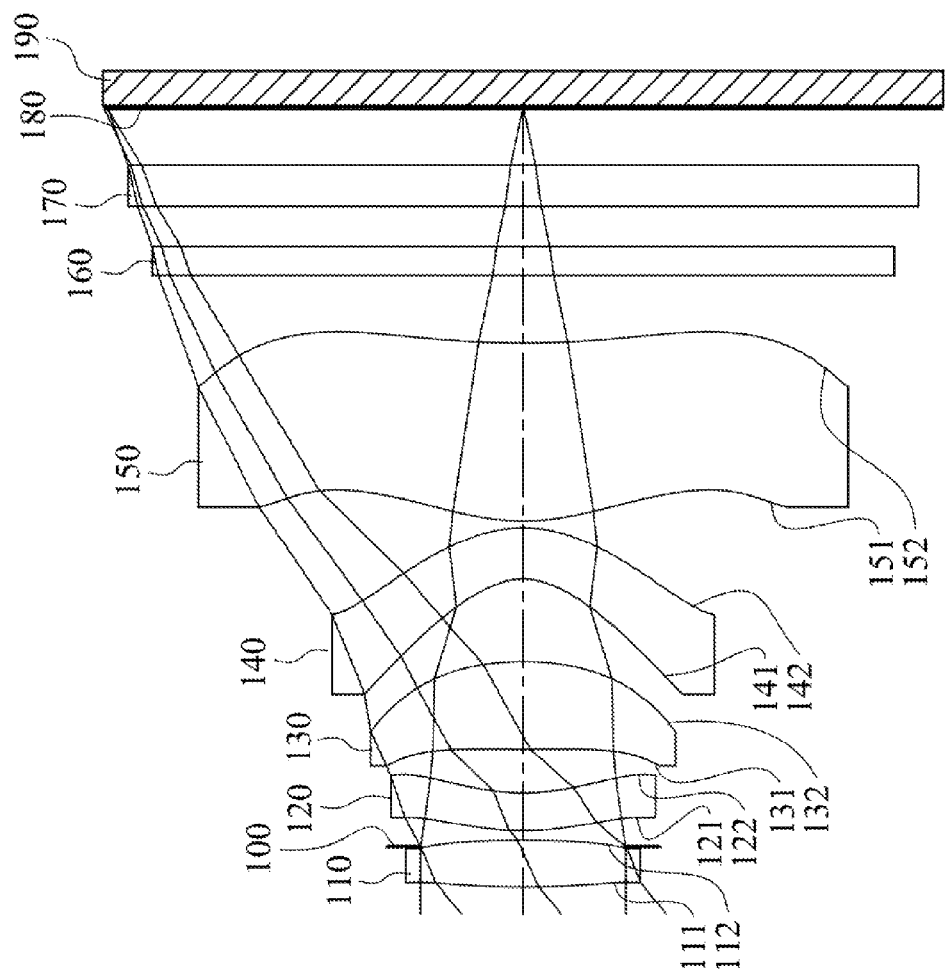
FIG. 1 is a schematic view of an image capturing device according to the 1st embodiment of the present disclosure.

An optical lens assembly includes, in order from an object side to an image side, a first lens element, a second lens element, a third lens element, a fourth lens element and a fifth lens element, wherein the optical lens assembly has a total of five lens elements with refractive power.

The first lens element with positive refractive power has an object-side surface being convex in a paraxial region thereof. Therefore, the total track length of the optical lens assembly can be reduced by adjusting the positive refractive power of the first lens element.

The second lens element has negative refractive power, so that the aberration generated from the first lens element can be corrected.

The third lens element can have positive refractive power and an image-side surface being convex in a paraxial region thereof. Therefore, the photosensitivity of the optical lens assembly can be reduced.

The fourth lens element with negative refractive power has an object-side surface being concave in a paraxial region thereof and an image-side surface being convex in a paraxial region thereof. Therefore, the astigmatism of the optical lens assembly can be corrected.

At least one of the second lens element, the third lens element and the fourth lens element has at least one inflection point thereon. Therefore, it is favorable for effectively reducing the incident angle of the off-axis on an image sensor so as to increase the responding efficiency thereof.

The fifth lens element with positive refractive power can have an object-side surface being convex in a paraxial region thereof and an image-side surface being concave in a paraxial region thereof. Therefore, the astigmatism can be corrected. Furthermore, the image-side surface of the fifth lens element can have at least one convex shape in an off-axis region thereof, and at least one of the object-side surface and the image-side surface of the fifth lens element can have at least one inflection point in an off-axis region thereof. Therefore, the aberration of the off-axis can be corrected effectively.

When a focal length of the second lens element is f2, and a focal length of the fifth lens element is f5, the following condition is satisfied: $f2/f5 < -1.2$. Therefore, the positive refractive power of the fifth lens element is great enough for enlarging the field of view of the optical lens assembly. Preferably, the following condition is satisfied: $f2/f5 < -1.75$. More preferably, the following condition is satisfied: $f2/f5 < -3.5$.

When a focal length of the optical lens assembly is f, a focal length of the fourth lens element is f4, and the focal length of the fifth lens element is f5, and the following conditions are satisfied: $1.50 \leq |f/f4| + (f/f5)$. Therefore, the back focal length is long enough for incorporating other optical elements, such as optical filter, cover glass or prism, and the difficulty of the assembly can be reduced. Preferably, the following condition is satisfied: $2.0 < |f/f4| + (f/f5) < 3.5$.

When a distance in parallel with an optical axis from an axial vertex on an object-side surface of the third lens element to a maximum effective radius position on the object-side surface of the third lens element is SAG31, a distance in parallel with an optical axis from an axial vertex on an image-side surface of the third lens element to a maximum effective radius position on the image-side surface of the third lens element is SAG32, and a central thickness of the third lens element is CT3, the following condition is satisfied: (SAG31+SAG32)/CT3<−0.65. Therefore, the surface shape of the third lens element is favorable for manufacturing and molding the lens elements and keeping the arrangement of the optical lens assembly more compact.

When the focal length of the optical lens assembly is f, the focal length of the fourth lens element is f4, and the following condition is satisfied: f/f4<−1.0. Therefore, it's favorable for correcting the Petzval's Sum of the optical lens assembly to improve the flatness of the image plane.

When a focal length of the first lens element is f1, and a focal length of the third lens element is f3, the following condition is satisfied: 0.1<f3/f1<1.0. Therefore, the spherical aberration can be reduced.

When the focal length of the third lens element is f3, and the focal length of the fifth lens element is f5, the following condition is satisfied: 0.6<f3/f5<1.6. Therefore, the photosensitivity of the optical lens assembly can be reduced.

When the focal length of the first lens element is f1, the focal length of the second lens element is f2, the focal length of the third lens element is f3, and the focal length of the fourth lens element is f4, the following condition is satisfied: |f2|>|fx|, wherein x=1, 3, or 4. Therefore, the aberration can be reduced by balancing the refractive powers.

When the focal length of the optical lens assembly is f, and a curvature radius of the object-side surface of the first lens element is R1, the following condition is satisfied: 0<f/R1<1.45. Therefore, the total track length of the optical lens assembly can be reduced.

When a distance in parallel with an optical axis from an axial vertex on the object-side surface of the fifth lens element to a critical point on the object-side surface of the fifth lens element which is closest to an image plane of the optical lens assembly is Z51, an axial distance between the first lens element and the second lens element is T12, an axial distance between the second lens element and the third lens element is T23, an axial distance between the third lens element and the fourth lens element is T34, an axial distance between the fourth lens element and the fifth lens element is T45, and a total axial distance of the intervals between each lens element adjacent to each other is ΣAT, wherein ΣAT=T12+T23+T34+T45, the following condition is satisfied: 0.18≤Z51/ΣAT<0.50. Therefore, it is favorable for the assembling of the lens elements and the manufacturing yield rate can be increased.

When the focal length of the optical lens assembly is f, a curvature radius of the object-side surface of the fourth lens element is R7, and a curvature radius of the image-side surface of the fourth lens element is R8, the following condition is satisfied: 1.7<f/(|R7|+|R8|)<4.0. Preferably, the following condition is satisfied: 2.0<f/(|R7|+|R8|)<4.0.

When the focal length of the optical lens assembly is f, and the focal length of the second lens element is f2, the following condition is satisfied: −0.40<f/f2<0. Therefore, the aberration generated from the first lens element can be corrected.

According to the optical lens assembly of the present disclosure, the lens elements thereof can be made of glass or plastic material. When the lens elements are made of glass material, the distribution of the refractive power of the optical lens assembly may be more flexible to design. When the lens elements are made of plastic material, the manufacturing cost can be effectively reduced. Furthermore, surfaces of each lens element can be arranged to be aspheric, since the aspheric surface of the lens element is easy to form a shape other than spherical surface so as to have more controllable variables for eliminating the aberration thereof, and to further decrease the required number of the lens elements. Therefore, the total track length of the optical lens assembly can also be reduced.

According to the optical lens assembly of the present disclosure, each of an object-side surface in a paraxial region thereof and an image-side surface has a paraxial region and an off-axis region. The paraxial region refers to the region of the surface where light rays travel close to the optical axis, and the off-axis region refers to the region of the surface where light rays travel away from the optical axis. Particularly, when the lens element has a convex surface, it indicates that the surface is convex in the paraxial region thereof; when the lens element has a concave surface, it indicates that the surface is concave in the paraxial region thereof.

According to the optical lens assembly of the present disclosure, critical point is a non-axial point of the lens surface where its tangent is perpendicular to an optical axis.

According to the optical lens assembly of the present disclosure, the optical lens assembly can include at least one stop, such as an aperture stop, a glare stop or a field stop. Said glare stop or said field stop is for eliminating the stray light and thereby improving the image resolution thereof.

According to the optical lens assembly of the present disclosure, an aperture stop can be configured as a front stop or a middle stop. A front stop disposed between an imaged object and the first lens element can provide a longer distance between an exit pupil of the optical lens assembly and the image plane and thereby improves the image-sensing efficiency of an image sensor. A middle stop disposed between the first lens element and the image plane is favorable for enlarging the field of view of the optical lens assembly and thereby provides a wider field of view for the same.

The present optical lens assembly can be optionally applied to moving focus optical systems. According to the optical lens assembly of the present disclosure, the optical lens assembly is featured with good correction ability and high image quality, and can be applied to 3D (three-dimensional) image capturing applications, in products such as digital cameras, mobile devices, digital tablets, wearable devices and other mobile terminals.

According to the present disclosure, an image capturing device is provided. The image capturing device includes the optical lens assembly according to the aforementioned optical lens assembly of the present disclosure, and an image sensor, wherein the image sensor is located on the image side of the aforementioned optical lens assembly, that is, the image sensor can be disposed on or near an image plane of the aforementioned optical lens assembly. Therefore, the image capturing device can have large field of view and provide better assembling yield rate. Preferably, the image capturing device can further include a barrel member, a holding member or a combination thereof.

According to the present disclosure, a mobile terminal is provided, wherein the mobile terminal includes the aforementioned image capturing device. Therefore, the mobile terminal provides good image quality. Preferably, the mobile terminal can further include but not limited to display, control unit, random access memory unit (RAM), storage unit or a combination thereof.

According to the above description of the present disclosure, the following 1st-14th specific embodiments are provided for further explanation.

1st Embodiment

FIG. 1 is a schematic view of an image capturing device according to the 1st embodiment of the present disclosure.

Figure 2:
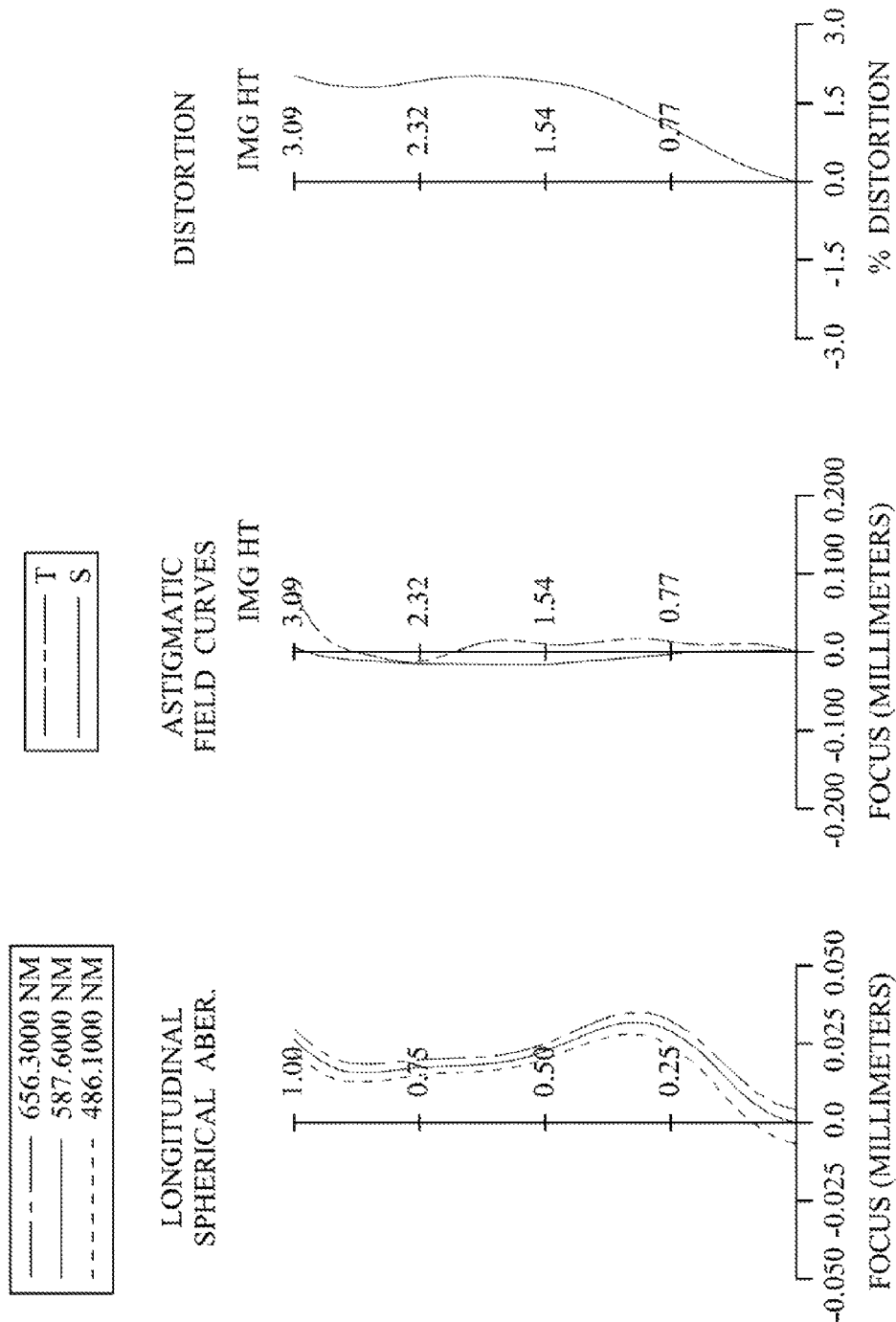
FIG. 2 shows, in order from left to right, spherical aberration curves, astigmatic field curves and a distortion curve of the image capturing device according to the 1st embodiment.

FIG. 2 shows, in order from left to right, spherical aberration curves, astigmatic field curves and a distortion curve of the image capturing device according to the 1st embodiment. In FIG. 1, the image capturing device includes an optical lens assembly and an image sensor 190. The optical lens assembly includes, in order from an object side to an image side, a first lens element 110, an aperture stop 100, a second lens element 120, a third lens element 130, a fourth lens element 140, a fifth lens element 150, an IR-cut filter 160, a cover glass 170 and an image plane 180, wherein the image sensor 190 is disposed on the image plane 180, and the optical lens assembly has a total of five lens elements (110-150) with refractive power.

The first lens element 110 with positive refractive power has an object-side surface 111 being convex in a paraxial region thereof and an image-side surface 112 being convex in a paraxial region thereof. The first lens element 110 is made of plastic material, and the object-side surface 111 and the image-side surface 112 of the first lens element 110 are aspheric.

The second lens element 120 with negative refractive power has an object-side surface 121 being convex in a paraxial region thereof and an image-side surface 122 being concave in a paraxial region thereof. The second lens element 120 is made of plastic material, and the object-side surface 121 and the image-side surface 122 of the second lens element 120 are aspheric. Furthermore, both of the object-side surface 121 and the image-side surface 122 of the second lens element 120 have at least one inflection point.

The third lens element 130 with positive refractive power has an object-side surface 131 being convex in a paraxial region thereof and an image-side surface 132 being convex in a paraxial region thereof. The third lens element 130 is made of plastic material, and the object-side surface 131 and the image-side surface 132 of the third lens element 130 are aspheric. Furthermore, both of the object-side surface 131 and the image-side surface 132 of the third lens element 130 have at least one inflection point.

The fourth lens element 140 with negative refractive power has an object-side surface 141 being concave in a paraxial region thereof and an image-side surface 142 being convex in a paraxial region thereof. The fourth lens element 140 is made of plastic material, and the object-side surface 141 and the image-side surface 142 of the fourth lens element 140 are aspheric. Furthermore, both of the object-side surface 141 and the image-side surface 142 of the fourth lens element 140 have at least one inflection point.

The fifth lens element 150 with positive refractive power has an object-side surface 151 being convex in a paraxial region thereof and an image-side surface 152 being concave in a paraxial region thereof. The fifth lens element 150 is made of plastic material, and the object-side surface 151 and the image-side surface 152 of the fifth lens element 150 are aspheric. The image-side surface 151 of the fifth lens element 150 has at least one convex shape in an off-axis region thereof. Furthermore, both of the object-side surface 151 and the image-side surface 152 of the fifth lens element 150 have at least one inflection point in the off-axis region thereof.

The IR-cut filter 160 and the cover glass 170 are made of glass and located in order from the object side to the image side between the fifth lens element 150 and the image plane 180, and will not affect the focal length of the optical lens assembly.

The equation of the aspheric surface profiles of the aforementioned lens elements of the 1st embodiment is expressed as follows:

$$X(Y) = (Y^2/R)/(1 + sqrt(1 - (1+k) \times (Y/R)^2)) + \sum_i (Ai) \times (Y^i),$$

where,

X is the relative distance between a point on the aspheric surface spaced at a distance Y from the optical axis and the tangential plane at the aspheric surface vertex on the optical axis;

Y is the vertical distance from the point on the aspheric surface to the optical axis;

R is the curvature radius;

k is the conic coefficient; and

Ai is the i-th aspheric coefficient.

In the optical lens assembly of the image capturing device according to the 1st embodiment, when a focal length of the optical lens assembly is f, an f-number of the optical lens assembly is Fno, and half of a maximal field of view of the optical lens assembly is HFOV, these parameters have the following values: f=3.66 mm; Fno=2.42; and HFOV=39.5 degrees.

Figure 23:
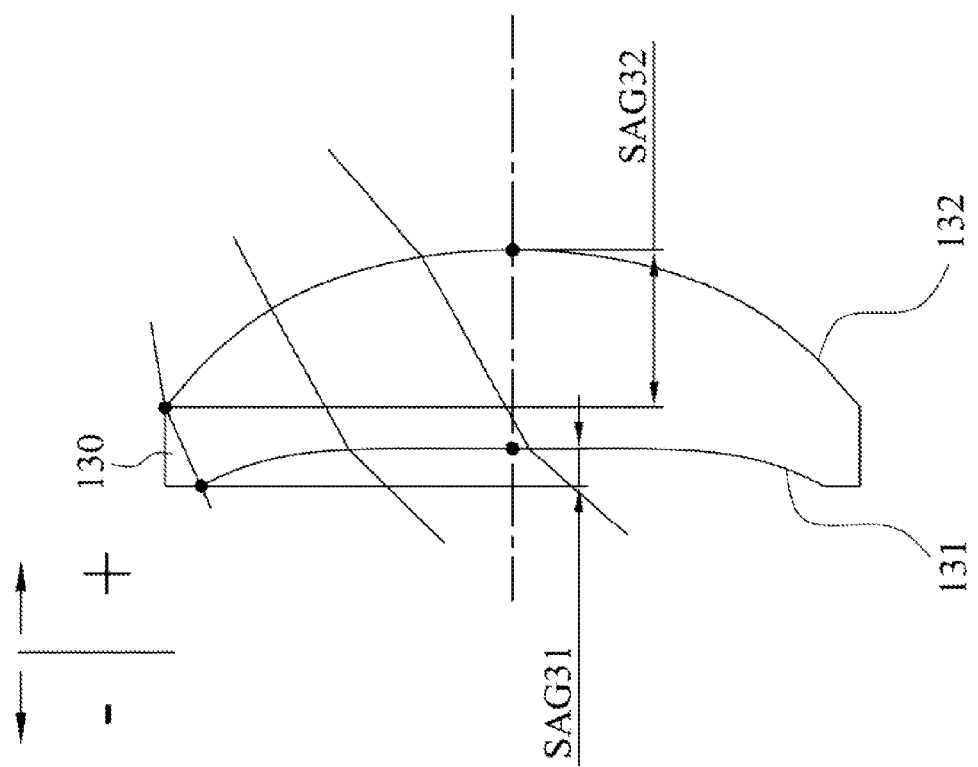
FIG. 23 is a schematic view of parameters SAG31 and SAG32 of the third lens element of FIG. 1.

FIG. 23 is a schematic view of parameters SAG31 and SAG 32 of the third lens element 130 of FIG. 1. In FIG. 23, when a distance in parallel with an optical axis from an axial vertex on the object-side surface 131 of the third lens element 130 to a maximum effective radius position on the object-side surface 131 of the third lens element 130 is SAG31, a distance in parallel with the optical axis from an axial vertex on the image-side surface 132 of the third lens element 130 to a maximum effective radius position on the image-side surface 132 of the third lens element 130 is SAG32 (when the aforementioned displacement towards the image side, SAG31 and SAG32 are positive; when the aforementioned displacement towards the object side, SAG31 and SAG32 are negative), and a central thickness of the third lens element 130 is CT3, the following condition is satisfied:

(SAG31+SAG32)/CT3=−0.98.

Figure 24:
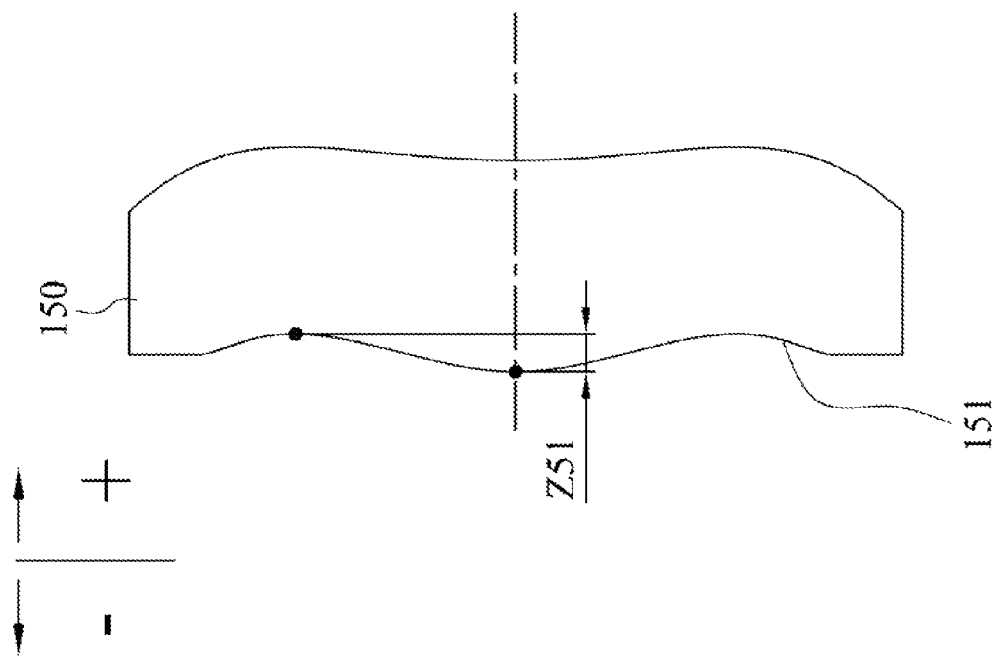
FIG. 24 is a schematic view of parameter Z51 of the fifth lens element of FIG. 1.

FIG. 24 is a schematic view of parameter Z51 of the fifth lens element 150 of FIG. 1. In FIG. 24, when a distance in parallel with the optical axis from an axial vertex on the object-side surface 151 of the fifth lens element 150 to a critical point on the object-side surface 151 of the fifth lens element 150 which is closest to the image plane 180 of the optical lens assembly is Z51, an axial distance between the first lens element 110 and the second lens element 120 is T12, an axial distance between the second lens element 120 and the third lens element 130 is T23, an axial distance between the third lens element 130 and the fourth lens element 140 is T34, an axial distance between the fourth lens element 140 and the fifth lens element 150 is T45, and a total axial distance of the intervals between each lens element adjacent to each other is ΣAT, wherein ΣAT=T12+T23+T34+T45, the following condition is satisfied:

Z51/ΣAT=0.22.

In the optical lens assembly of the image capturing device according to the 1st embodiment, when the focal length of the optical lens assembly is f, a curvature radius of the object-side surface 111 of the first lens element 110 is R1, a curvature radius of the object-side surface 141 of the fourth lens element 140 is R7, and a curvature radius of the image-side surface 142 of the fourth lens element 140 is R8, the following conditions are satisfied:

f/R1=0.56; and f/(|R7|+|R8|)=2.48.

In the optical lens assembly of the image capturing device according to the 1st embodiment, when the focal length of the optical lens assembly is f, a focal length of the first lens element 110 is f1, a focal length of the second lens element 120 is f2, a focal length of the third lens element 130 is f3, a focal length of the fourth lens element 140 is f4, and a focal length of the fifth lens element 150 is f5, the following conditions are satisfied:

$$f/f2=-0.26; f/f4=-1.34; f3/f1=0.54; f2/f5=-4.05;$$
$$f3/f5=0.98; \text{ and } |f/f4|+(f/f5)=2.39.$$

The detailed optical data of the 1st embodiment are shown in Table 1 and the aspheric surface data are shown in Table 2 below.

TABLE 1

1st Embodiment
f = 3.66 mm, Fno = 2.42, HFOV = 39.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | 6.507 | ASP | 0.341 | Plastic | 1.544 | 55.9 | 6.24 |
| 2 | | −6.965 | ASP | −0.050 | | | | |
| 3 | Ape. Stop | Plano | | 0.121 | | | | |
| 4 | Lens 2 | 1.964 | ASP | 0.280 | Plastic | 1.640 | 23.3 | −14.11 |
| 5 | | 1.523 | ASP | 0.321 | | | | |
| 6 | Lens 3 | 23.880 | ASP | 0.643 | Plastic | 1.544 | 55.9 | 3.40 |
| 7 | | −1.985 | ASP | 0.609 | | | | |
| 8 | Lens 4 | −0.522 | ASP | 0.380 | Plastic | 1.640 | 23.3 | −2.74 |
| 9 | | −0.953 | ASP | 0.050 | | | | |
| 10 | Lens 5 | 1.574 | ASP | 1.309 | Plastic | 1.535 | 55.7 | 3.48 |
| 11 | | 7.239 | ASP | 0.500 | | | | |
| 12 | IR-cut filter | Plano | | 0.210 | Glass | 1.517 | 64.2 | — |
| 13 | | Plano | | 0.300 | | | | |
| 14 | Cover-glass | Plano | | 0.300 | Glass | 1.517 | 64.2 | — |
| 15 | | Plano | | 0.429 | | | | |
| 16 | Image | Plano | | — | | | | |

Note:
Reference wavelength (d-line) is 587.6 nm.

TABLE 2

Aspheric Coefficients

| | Surface # | | | | |
|---|---|---|---|---|---|
| | 1 | 2 | 4 | 5 | 6 |
| k = | 8.1524E+00 | 8.5779E+00 | −2.8393E+01 | −5.1953E+00 | 3.6454E+01 |
| A4 = | −1.3467E−02 | −3.8520E−02 | 2.1285E−01 | −1.0110E−01 | −1.1890E−01 |
| A6 = | 4.3101E−02 | 8.8298E−02 | −8.5325E−01 | 5.4508E−02 | 1.0149E−01 |
| A8 = | −4.3185E−01 | −3.1456E−01 | 2.0688E+00 | −3.1740E−02 | −5.5312E−01 |
| A10 = | 1.0149E+00 | 3.4948E−01 | −3.5806E+00 | −1.9497E−01 | 1.1908E+00 |
| A12 = | −1.4081E+00 | −2.7336E−01 | 3.8362E+00 | 3.6094E−01 | −1.4428E+00 |
| A14 = | 1.0455E+00 | 1.5965E−01 | −2.4556E+00 | −3.4603E−01 | 8.7709E−01 |
| A16 = | −3.4628E−01 | −7.2472E−02 | 7.1244E−01 | 1.3726E−01 | −1.9522E−01 |

| | Surface # | | | | |
|---|---|---|---|---|---|
| | 7 | 8 | 9 | 10 | 11 |
| k = | −5.9877E+00 | −1.6142E+00 | −1.5546E+00 | −1.7722E+00 | −9.0000E+01 |
| A4 = | −1.9062E−01 | 1.7147E−01 | 1.3199E−01 | −1.8411E−01 | 3.9435E−02 |
| A6 = | 1.12417E−01 | −6.5728E−01 | −2.7376E−01 | 1.3110E−01 | −4.4486E−02 |
| A8 = | −2.7884E−01 | 1.1997E+00 | 3.3988E−01 | −8.4571E−02 | 1.9939E−02 |
| A10 = | 3.1504E−01 | −1.2222E+00 | −2.0814E−01 | 3.8484E−02 | −5.6401E−03 |
| A12 = | −1.3004E−01 | 7.5747E−01 | 6.1378E−02 | −1.1414E−02 | 9.6859E−04 |
| A14 = | −5.1702E−02 | −2.9700E−01 | −7.0059E−03 | 1.9097E−03 | −9.3191E−05 |
| A16 = | 4.2528E−02 | 5.9987E−02 | 2.2584E−04 | −1.3222E−04 | 3.8984E−06 |

In Table 1, the curvature radius, the thickness and the focal length are shown in millimeters (mm). Surface numbers 0-16 represent the surfaces sequentially arranged from the object-side to the image-side along the optical axis. In Table 2, k represents the conic coefficient of the equation of the aspheric surface profiles. A4-A16 represent the aspheric coefficients ranging from the 4th order to the 16th order. The tables presented below for each embodiment are the corresponding schematic parameter and aberration curves, and the definitions of the tables are the same as Table 1 and Table 2 of the 1st embodiment. Therefore, an explanation in this regard will not be provided again.

2nd Embodiment

Figure 3:
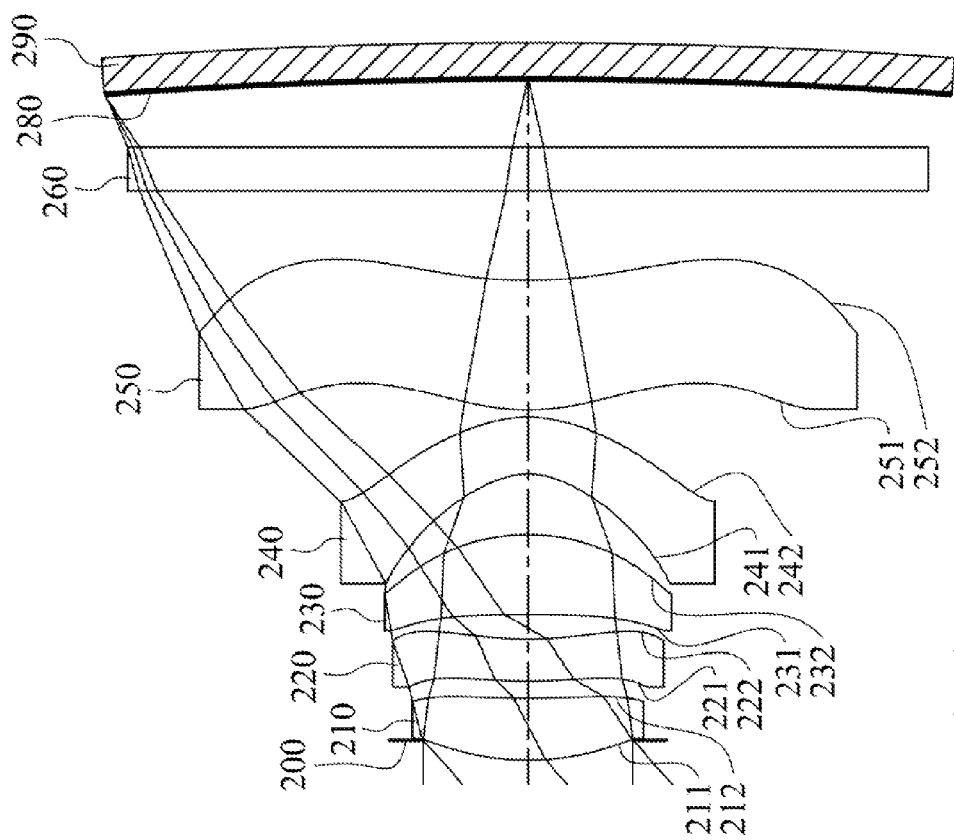
FIG. 3 is a schematic view of an image capturing device according to the 2nd embodiment of the present disclosure.
Figure 4:
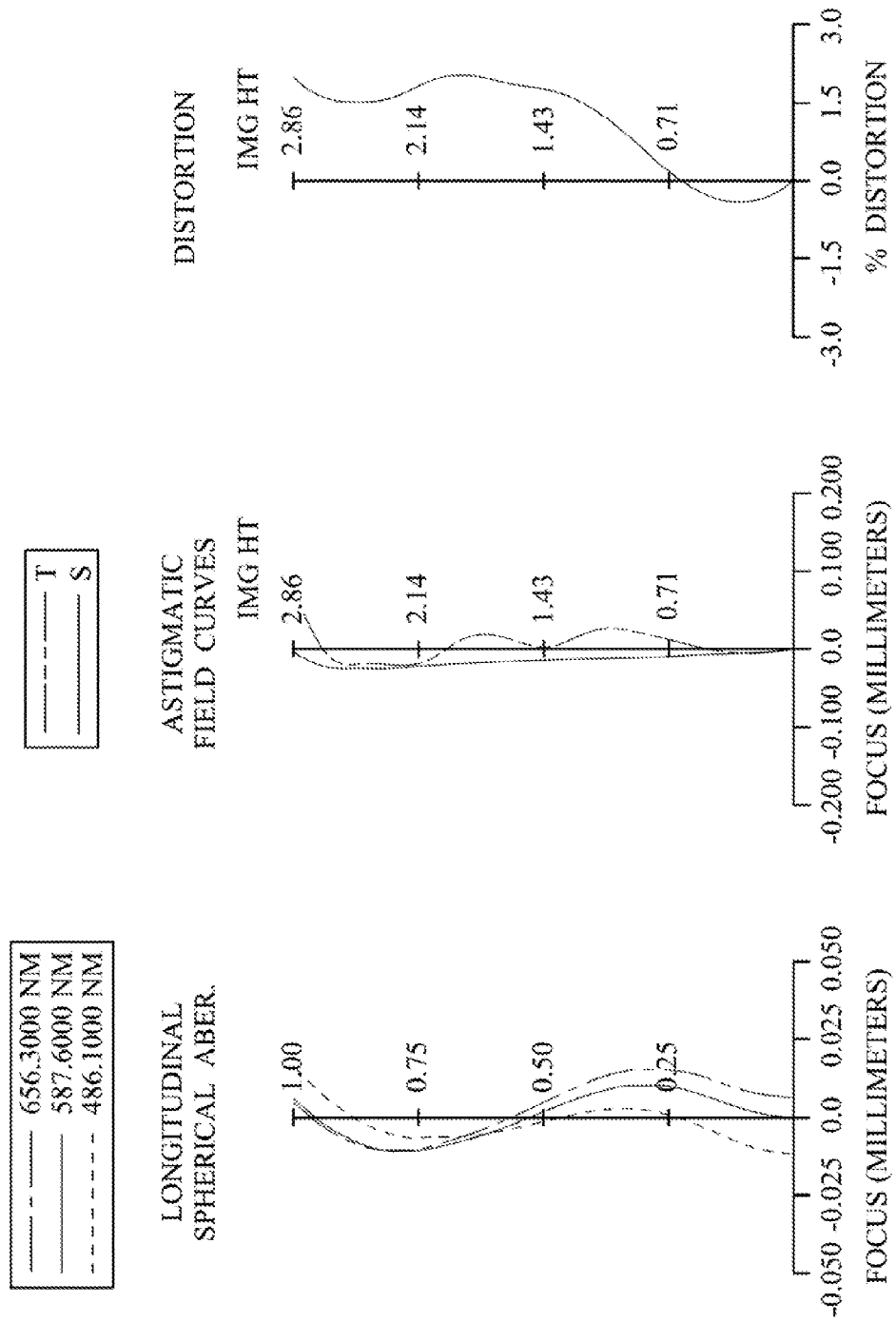
FIG. 4 shows, in order from left to right, spherical aberration curves, astigmatic field curves and a distortion curve of the image capturing device according to the 2nd embodiment.

FIG. 3 is a schematic view of an image capturing device according to the 2nd embodiment of the present disclosure. FIG. 4 shows, in order from left to right, spherical aberration curves, astigmatic field curves and a distortion curve of the image capturing device according to the 2nd embodiment. In FIG. 3, the image capturing device includes an optical lens assembly and an image sensor 290. The optical lens assembly includes, in order from an object side to an image side, an aperture stop 200, a first lens element 210, a second lens element 220, a third lens element 230, a fourth lens element 240, a fifth lens element 250, an IR-cut filter 260 and an image plane 280, wherein the image sensor 290 is disposed on the image plane 280, and the optical lens assembly has a total of five lens elements (210-250) with refractive power.

The first lens element 210 with positive refractive power has an object-side surface 211 being convex in a paraxial region thereof and an image-side surface 212 being concave in a paraxial region thereof. The first lens element 210 is made of plastic material, and the object-side surface 211 and the image-side surface 212 of the first lens element 210 are aspheric.

The second lens element 220 with negative refractive power has an object-side surface 221 being convex in a paraxial region thereof and an image-side surface 222 being concave in a paraxial region thereof. The second lens element 220 is made of plastic material, and the object-side surface 221 and the image-side surface 222 of the second lens element 220 are aspheric. Furthermore, both of the object-side surface 221 and the image-side surface 222 of the second lens element 220 have at least one inflection point.

The third lens element 230 with positive refractive power has an object-side surface 231 being concave in a paraxial region thereof and an image-side surface 232 being convex in a paraxial region thereof. The third lens element 230 is made of plastic material, and the object-side surface 231 and the image-side surface 232 of the third lens element 230 are aspheric. Furthermore, both of the object-side surface 231 and the image-side surface 232 of the third lens element 230 have at least one inflection point.

The fourth lens element 240 with negative refractive power has an object-side surface 241 being concave in a paraxial region thereof and an image-side surface 242 being convex in a paraxial region thereof. The fourth lens element 240 is made of plastic material, and the object-side surface 241 and the image-side surface 242 of the fourth lens element 240 are aspheric. Furthermore, the image-side surface 242 of the fourth lens element 240 has at least one inflection point.

The fifth lens element 250 with positive refractive power has an object-side surface 251 being convex in a paraxial region thereof and an image-side surface 252 being concave in a paraxial region thereof. The fifth lens element 250 is made of plastic material, and the object-side surface 251 and the image-side surface 252 of the fifth lens element 250 are aspheric. The image-side surface 251 of the fifth lens element 250 has at least one convex shape in an off-axis region thereof. Furthermore, both of the object-side surface 251 and the image-side surface 252 of the fifth lens element 250 have at least one inflection point in the off-axis region thereof.

The IR-cut filter 260 is made of glass and located between the fifth lens element 250 and the image plane 280, and will not affect the focal length of the optical lens assembly.

The detailed optical data of the 2nd embodiment are shown in Table 3 and the aspheric surface data are shown in Table 4 below.

TABLE 3

2nd Embodiment
f = 3.22 mm, Fno = 2.28, HFOV = 41.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.136 | | | | |
| 2 | Lens 1 | 1.758 | ASP | 0.419 | Plastic | 1.544 | 55.9 | 4.35 |
| 3 | | 6.283 | ASP | 0.115 | | | | |
| 4 | Lens 2 | 3.254 | ASP | 0.280 | Plastic | 1.633 | 23.4 | −15.18 |
| 5 | | 2.350 | ASP | 0.166 | | | | |
| 6 | Lens 3 | −11.889 | ASP | 0.539 | Plastic | 1.544 | 55.9 | 2.85 |
| 7 | | −1.393 | ASP | 0.414 | | | | |
| 8 | Lens 4 | −0.500 | ASP | 0.380 | Plastic | 1.633 | 23.4 | −3.15 |
| 9 | | −0.864 | ASP | 0.050 | | | | |
| 10 | Lens 5 | 1.587 | ASP | 0.876 | Plastic | 1.530 | 55.8 | 5.76 |
| 11 | | 2.673 | ASP | 0.600 | | | | |
| 12 | IR-cut filter | Plano | | 0.300 | Glass | 1.517 | 64.2 | — |
| 13 | | Plano | | 0.461 | | | | |
| 14 | Image | −40.000 | | — | | | | |

Note:
Reference wavelength (d-line) is 587.6 nm.

TABLE 4

Aspheric Coefficients

| | Surface # | | | | |
|---|---|---|---|---|---|
| | 2 | 3 | 4 | 5 | 6 |
| k = | 2.3914E+00 | 5.6279E+01 | −9.0000E+01 | −4.7792E+00 | −7.6032E+01 |
| A4 = | −6.6901E−02 | −1.8923E−01 | −6.0318E−03 | −1.6452E−01 | −9.4999E−02 |
| A6 = | 2.2481E−02 | 6.4552E−02 | −7.8668E−01 | 6.2028E−03 | 6.1798E−02 |
| A8 = | −3.9115E−01 | −3.0406E−01 | 1.9629E+00 | −3.7870E−02 | −5.4562E−01 |

TABLE 4-continued

| Aspheric Coefficients | | | | | |
|---|---|---|---|---|---|
| A10 = | 8.8609E−01 | 1.9063E−01 | −3.7264E+00 | −2.0218E−01 | 1.1978E+00 |
| A12 = | −1.5261E+00 | −3.4787E−01 | 3.9014E+00 | 3.0467E−01 | −1.4010E+00 |
| A14 = | 1.0455E+00 | 1.5965E−01 | −2.2849E+00 | 2.8498E−01 | 9.3068E−01 |
| A16 = | −3.4628E−01 | −7.2472E−02 | 5.7354E−01 | 8.5541E−02 | −2.2405E−01 |

| | Surface # | | | | |
|---|---|---|---|---|---|
| | 7 | 8 | 9 | 10 | 11 |
| k = | −5.4162E+00 | −2.3699E+00 | −1.2892E+00 | 2.1404E+00 | −9.0000E+01 |
| A4 = | −2.3465E−01 | −6.3117E−02 | 5.7598E−01 | −7.6959E−02 | 1.7604E−01 |
| A6 = | 1.2477E−01 | −6.6459E−01 | −1.3928E+00 | −1.2744E−01 | −2.3627E−01 |
| A8 = | −2.7531E−01 | 1.2512E+00 | 1.7323E+00 | 1.5618E−01 | 1.4384E−01 |
| A10 = | 3.1311E−01 | −1.2070E+00 | −1.1309E+00 | −8.4352E−02 | −5.1749E−02 |
| A12 = | −1.2294E−01 | 7.0795E−01 | 3.3656E−01 | 2.4126E−02 | 1.0971E−02 |
| A14 = | −3.5343E−02 | −3.6137E−01 | −6.3546E−03 | −3.4837E−03 | −1.2742E−03 |
| A16 = | 6.8237E−02 | 6.6362E−02 | −1.1498E−02 | 1.9989E−04 | 6.2696E−05 |

In the 2nd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 2nd embodiment, so an explanation in this regard will not be provided again.

Moreover, these parameters can be calculated from Table 3 and Table 4 as the following values and satisfy the following conditions:

| 2nd embodiment | | | |
|---|---|---|---|
| f [mm] | 3.22 | f/f2 | −0.21 |
| Fno | 2.28 | f/f4 | −1.04 |
| HFOV [deg.] | 41.6 | f3/f1 | 0.65 |
| (SAG31 + SAG32)/CT3 | −0.94 | f2/f5 | −2.65 |
| Z51/ΣAT | 0.24 | f3/f5 | 0.49 |
| f/R1 | 1.83 | |f/f4| + (f/f5) | 1.60 |
| f/(|R7| + |R8|) | 2.36 | | |

3rd Embodiment

Figure 5:
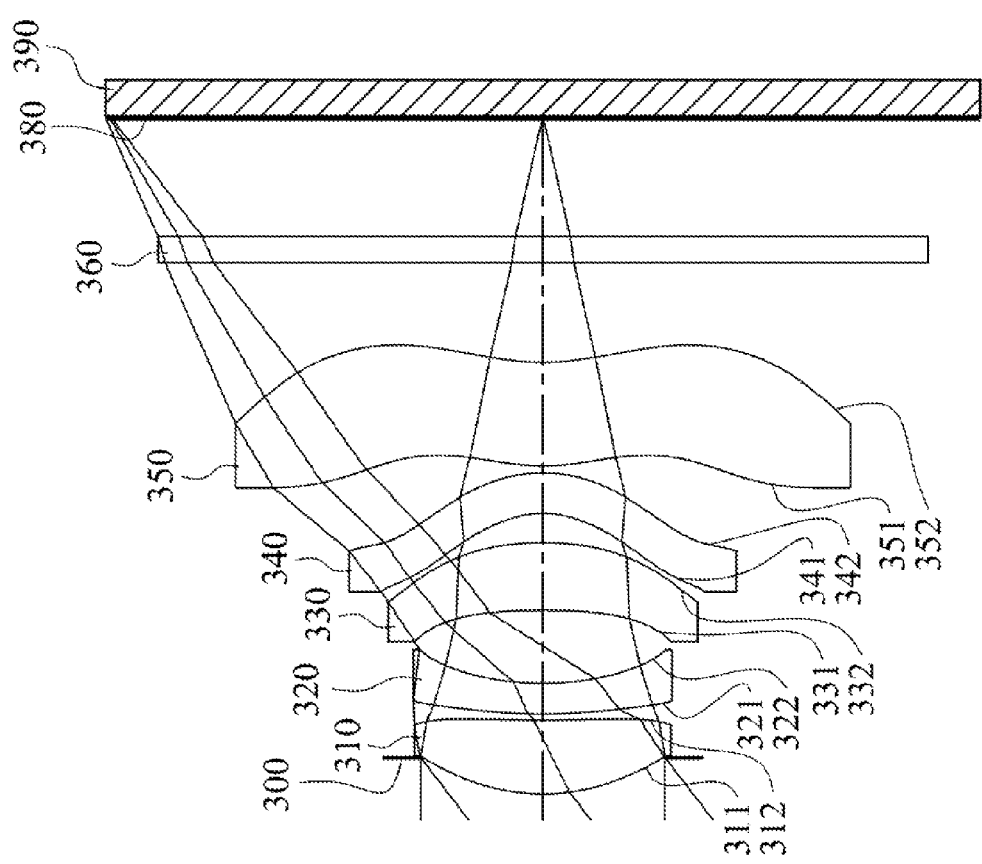
FIG. 5 is a schematic view of an image capturing device according to the 3rd embodiment of the present disclosure.
Figure 6:
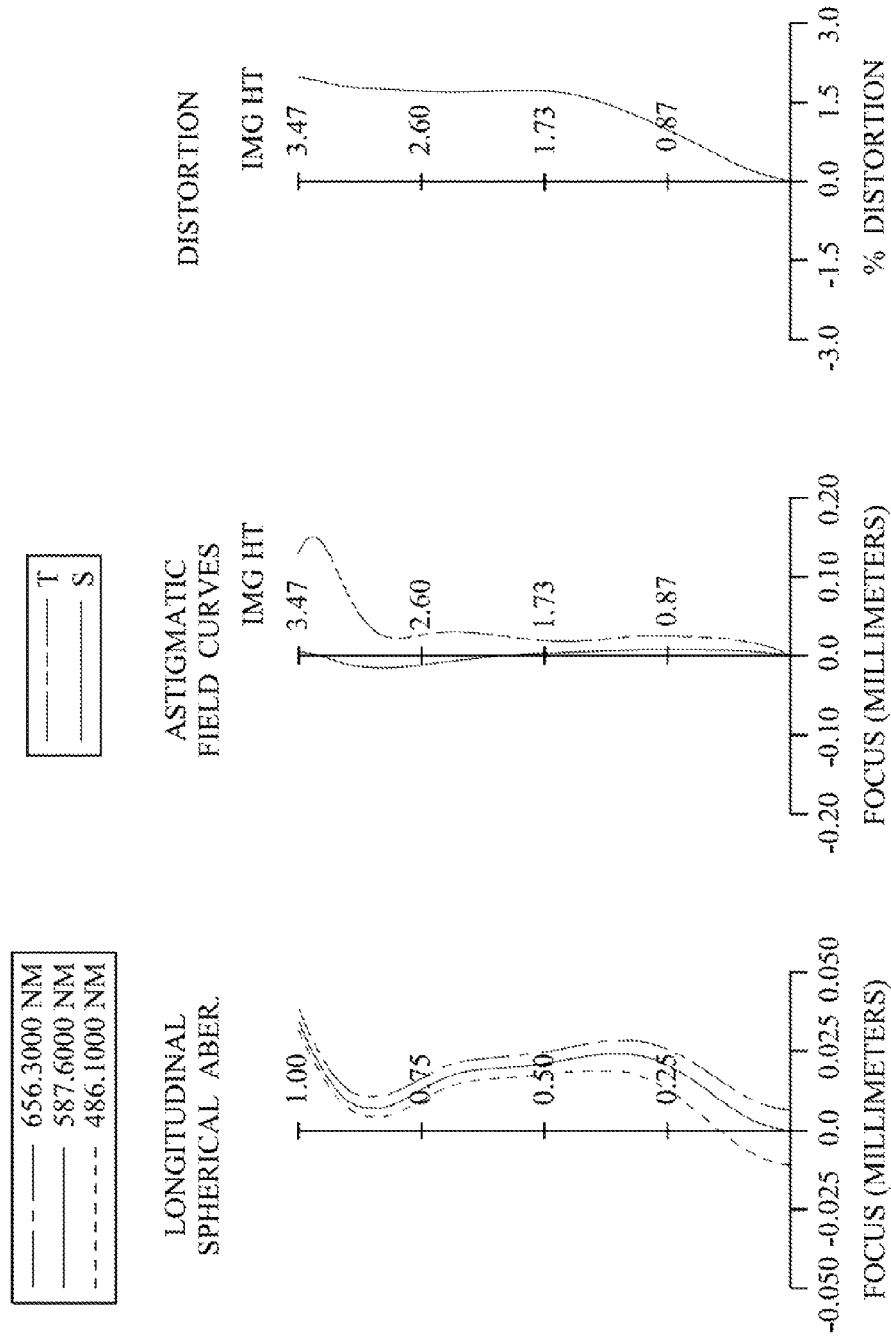
FIG. 6 shows, in order from left to right, spherical aberration curves, astigmatic field curves and a distortion curve of the image capturing device according to the 3rd embodiment.

FIG. 5 is a schematic view of an image capturing device according to the 3rd embodiment of the present disclosure. FIG. 6 shows, in order from left to right, spherical aberration curves, astigmatic field curves and a distortion curve of the image capturing device according to the 3rd embodiment. In FIG. 5, the image capturing device includes an optical lens assembly and an image sensor 390. The optical lens assembly includes, in order from an object side to an image side, an aperture stop 300, a first lens element 310, a second lens element 320, a third lens element 330, a fourth lens element 340, a fifth lens element 350, an IR-cut filter 360 and an image plane 380, wherein the image sensor 390 is disposed on the image plane 380, and the optical lens assembly has a total of five lens elements (310-350) with refractive power.

The first lens element 310 with positive refractive power has an object-side surface 311 being convex in a paraxial region thereof and an image-side surface 312 being concave in a paraxial region thereof. The first lens element 310 is made of plastic material, and the object-side surface 311 and the image-side surface 312 of the first lens element 310 are aspheric.

The second lens element 320 with negative refractive power has an object-side surface 321 being convex in a paraxial region thereof and an image-side surface 322 being concave in a paraxial region thereof. The second lens element 320 is made of plastic material, and the object-side surface 321 and the image-side surface 322 of the second lens element 320 are aspheric.

The third lens element 330 with positive refractive power has an object-side surface 331 being concave in a paraxial region thereof and an image-side surface 332 being convex in a paraxial region thereof. The third lens element 330 is made of plastic material, and the object-side surface 331 and the image-side surface 332 of the third lens element 330 are aspheric. Furthermore, the image-side surface 332 of the third lens element 330 has at least one inflection point.

The fourth lens element 340 with negative refractive power has an object-side surface 341 being concave in a paraxial region thereof and an image-side surface 342 being convex in a paraxial region thereof. The fourth lens element 340 is made of plastic material, and the object-side surface 341 and the image-side surface 342 of the fourth lens element 340 are aspheric. Furthermore, both of the object-side surface 341 and the image-side surface 342 of the fourth lens element 340 have at least one inflection point.

The fifth lens element 350 with positive refractive power has an object-side surface 351 being convex in a paraxial region thereof and an image-side surface 352 being concave in a paraxial region thereof. The fifth lens element 350 is made of plastic material, and the object-side surface 351 and the image-side surface 352 of the fifth lens element 350 are aspheric. The image-side surface 352 of the fifth lens element 350 has at least one convex shape in an off-axis region thereof. Furthermore, both of the object-side surface 351 and the image-side surface 352 of the fifth lens element 350 have at least one inflection point in the off-axis region thereof.

The IR-cut filter 360 is made of glass and located between the fifth lens element 350 and the image plane 380, and will not affect the focal length of the optical lens assembly.

The detailed optical data of the 3rd embodiment are shown in Table 5 and the aspheric surface data are shown in Table 6 below.

TABLE 5

3rd Embodiment
f = 4.41 mm, Fno = 2.25, HFOV = 37.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.291 | | | | |
| 2 | Lens 1 | 1.662 | ASP | 0.586 | Plastic | 1.544 | 55.9 | 3.75 |
| 3 | | 7.837 | ASP | 0.050 | | | | |
| 4 | Lens 2 | 3.549 | ASP | 0.250 | Plastic | 1.640 | 23.3 | −10.29 |
| 5 | | 2.243 | ASP | 0.584 | | | | |
| 6 | Lens 3 | −5.768 | ASP | 0.544 | Plastic | 1.544 | 55.9 | 7.51 |
| 7 | | −2.471 | ASP | 0.236 | | | | |
| 8 | Lens 4 | −0.746 | ASP | 0.320 | Plastic | 1.640 | 23.3 | −4.94 |
| 9 | | −1.139 | ASP | 0.055 | | | | |
| 10 | Lens 5 | 1.514 | ASP | 0.832 | Plastic | 1.544 | 55.9 | 7.28 |
| 11 | | 1.977 | ASP | 0.800 | | | | |
| 12 | IR-cut filter | Plano | | 0.210 | Glass | 1.517 | 64.2 | — |
| 13 | | Plano | | 0.954 | | | | |
| 14 | Image | Plano | | — | | | | |

Note:
Reference wavelength (d-line) is 587.6 nm.

TABLE 6

Aspheric Coefficients

| | Surface # | | | | |
|---|---|---|---|---|---|
| | 2 | 3 | 4 | 5 | 6 |
| k = | −4.8722E−01 | −9.0000E+01 | −5.6347E+01 | −2.8545E+00 | −1.9215E+01 |
| A4 = | 4.3721E−03 | −1.6923E−01 | −6.5447E−02 | −1.8805E−02 | −1.0806E−01 |
| A6 = | 3.7471E−02 | 3.5500E−01 | 1.8948E−01 | 1.6157E−01 | −2.5937E−02 |
| A8 = | −1.0476E−01 | −4.2835E−01 | −7.3237E−02 | −1.4553E−01 | 9.9991E−02 |
| A10 = | 1.2945E−01 | 2.0686E−01 | −2.3819E−01 | 8.6349E−02 | −2.1302E−01 |
| A12 = | −7.4717E−02 | −4.1940E−02 | 2.6846E−01 | −4.9139E−02 | 1.0286E−01 |
| A14 = | | | −7.0669E−02 | 3.8814E−02 | |

| | Surface # | | | | |
|---|---|---|---|---|---|
| | 7 | 8 | 9 | 10 | 11 |
| k = | −2.0130E+01 | −4.9678E+00 | −5.3770E+00 | −1.5214E+01 | −3.0271E+00 |
| A4 = | −2.6242E−01 | −5.1339E−01 | −3.7181E−01 | −1.1198E−01 | −1.3597E−01 |
| A6 = | 8.8475E−02 | 8.6528E−01 | 4.9710E−01 | −3.5718E−03 | 5.5435E−02 |
| A8 = | 7.8010E−02 | −1.2807E+00 | −5.2372E−01 | 1.7138E−02 | −1.9596E−02 |
| A10 = | −1.0926E−01 | 1.5717E+00 | 4.1116E−01 | −3.7048E−03 | 5.0413E−03 |
| A12 = | 4.1174E−02 | −1.1453E+00 | −1.7921E−01 | 1.2846E−05 | −8.4298E−04 |
| A14 = | −1.8465E−03 | 4.3591E−01 | 3.7988E−02 | 6.9852E−05 | 7.9329E−05 |
| A16 = | | −6.8449E−02 | −3.0491E−03 | −5.6719E−06 | −3.1166E−06 |

In the 3rd embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 3rd embodiment, so an explanation in this regard will not be provided again.

Moreover, these parameters can be calculated from Table 5 and Table 6 as the following values and satisfy the following conditions:

| 3rd embodiment | | | |
|---|---|---|---|
| f [mm] | 4.41 | f/f2 | −0.43 |
| Fno | 2.25 | f/f4 | −0.89 |
| HFOV [deg.] | 37.6 | f3/f1 | 2.00 |
| (SAG31 + SAG32)/CT3 | −1.33 | f2/f5 | −1.41 |

-continued

| 3rd embodiment | | | |
|---|---|---|---|
| Z51/ΣAT | 0.09 | f3/f5 | 1.03 |
| f/R1 | 2.65 | |f/f4| + (f/f5) | 1.50 |
| f/(|R7| + |R8|) | 2.34 | | |

4th Embodiment

Figure 7:
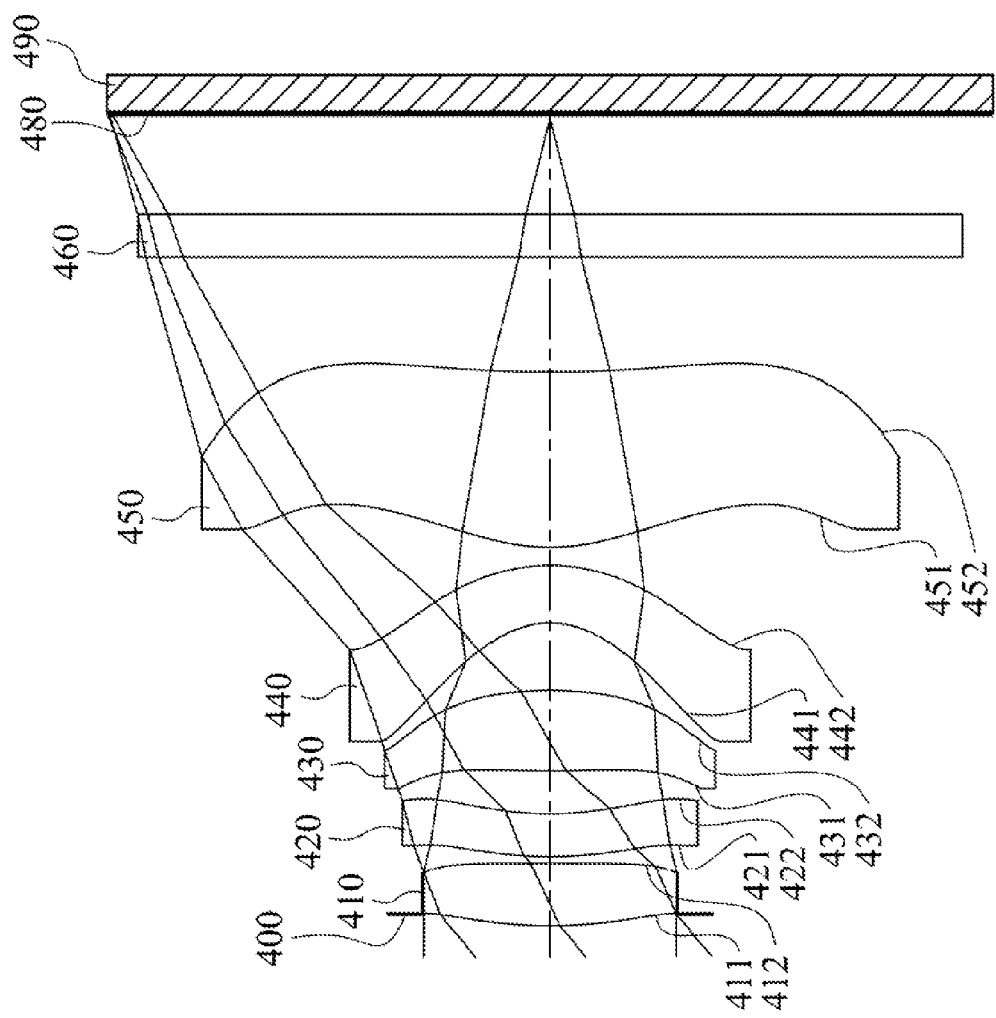
FIG. 7 is a schematic view of an image capturing device according to the 4th embodiment of the present disclosure.
Figure 8:
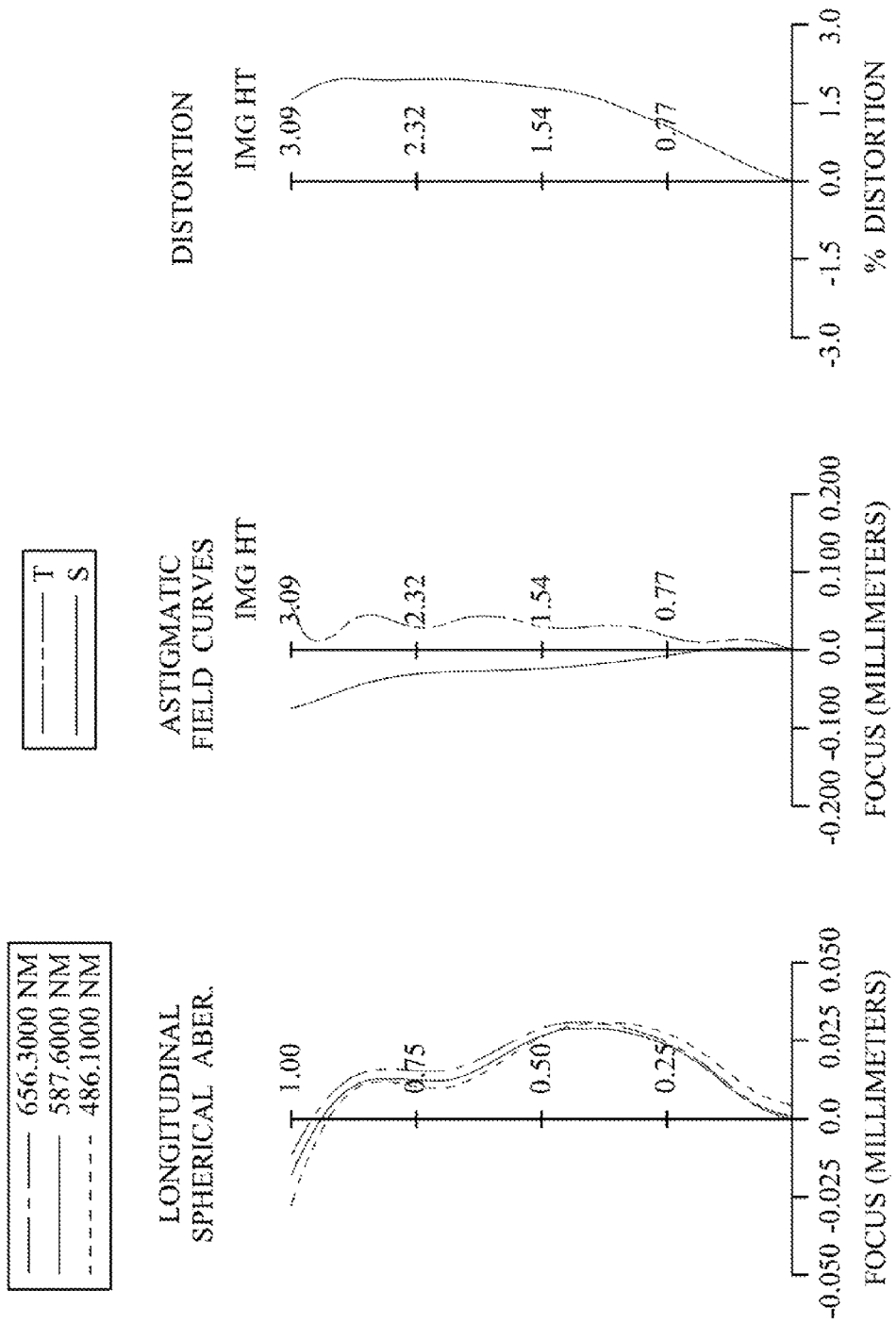
FIG. 8 shows, in order from left to right, spherical aberration curves, astigmatic field curves and a distortion curve of the image capturing device according to the 4th embodiment.

FIG. 7 is a schematic view of an image capturing device according to the 4th embodiment of the present disclosure. FIG. 8 shows, in order from left to right, spherical aberration curves, astigmatic field curves and a distortion curve of the image capturing device according to the 4th embodiment. In FIG. 7, the image capturing device includes an optical lens assembly and an image sensor 490. The optical lens assembly includes, in order from an object side to an image side, an aperture stop 400, a first lens element 410, a second lens element 420, a third lens element 430, a fourth lens element 440, a fifth lens element 450, an IR-cut filter 460 and an image plane 480, wherein the image sensor 490 is disposed on the image plane 480, and the optical lens assembly has a total of five lens elements (410-450) with refractive power.

The first lens element 410 with positive refractive power has an object-side surface 411 being convex in a paraxial region thereof and an image-side surface 412 being convex in a paraxial region thereof. The first lens element 410 is made of plastic material, and the object-side surface 411 and the image-side surface 412 of the first lens element 410 are aspheric.

The second lens element 420 with negative refractive power has an object-side surface 421 being convex in a paraxial region thereof and an image-side surface 422 being concave in a paraxial region thereof. The second lens element 420 is made of plastic material, and the object-side surface 421 and the image-side surface 422 of the second lens element 420 are aspheric. Furthermore, both of the object-side surface 421 and the image-side surface 422 of the second lens element 420 have at least one inflection point.

The third lens element 430 with positive refractive power has an object-side surface 431 being convex in a paraxial region thereof and an image-side surface 432 being convex in a paraxial region thereof. The third lens element 430 is made of plastic material, and the object-side surface 431 and the image-side surface 432 of the third lens element 430 are aspheric. Furthermore, both of the object-side surface 431 and the image-side surface 432 of the third lens element 430 have at least one inflection point.

The fourth lens element 440 with negative refractive power has an object-side surface 441 being concave in a paraxial region thereof and an image-side surface 442 being convex in a paraxial region thereof. The fourth lens element 440 is made of plastic material, and the object-side surface 441 and the image-side surface 442 of the fourth lens element 440 are aspheric. Furthermore, both of the object-side surface 441 and the image-side surface 442 of the fourth lens element 440 have at least one inflection point.

The fifth lens element 450 with positive refractive power has an object-side surface 451 being convex in a paraxial region thereof and an image-side surface 452 being concave in a paraxial region thereof. The fifth lens element 450 is made of plastic material, and the object-side surface 451 and the image-side surface 452 of the fifth lens element 450 are aspheric. The image-side surface 452 of the fifth lens element 450 has at least one convex shape in an off-axis region thereof. Furthermore, both of the object-side surface 451 and the image-side surface 452 of the fifth lens element 450 have at least one inflection point in the off-axis region thereof.

The IR-cut filter 460 is made of glass and located between the fifth lens element 450 and the image plane 480, and will not affect the focal length of the optical lens assembly.

The detailed optical data of the 4th embodiment are shown in Table 7 and the aspheric surface data are shown in Table 8 below.

TABLE 7

4th Embodiment
f = 3.62 mm, Fno = 2.06, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.081 | | | | |
| 2 | Lens 1 | 3.156 | ASP | 0.433 | Plastic | 1.544 | 55.9 | 5.47 |
| 3 | | −50.527 | ASP | 0.050 | | | | |
| 4 | Lens 2 | 3.109 | ASP | 0.298 | Plastic | 1.639 | 23.5 | −14.60 |
| 5 | | 2.244 | ASP | 0.300 | | | | |
| 6 | Lens 3 | 9.333 | ASP | 0.557 | Plastic | 1.544 | 55.9 | 3.88 |
| 7 | | −2.672 | ASP | 0.477 | | | | |
| 8 | Lens 4 | −0.559 | ASP | 0.400 | Plastic | 1.639 | 23.5 | −2.30 |
| 9 | | −1.154 | ASP | 0.126 | | | | |
| 10 | Lens 5 | 1.396 | ASP | 1.222 | Plastic | 1.544 | 55.9 | 2.76 |
| 11 | | 13.657 | ASP | 0.800 | | | | |
| 12 | IR-cut filter | Plano | | 0.300 | Glass | 1.517 | 64.2 | — |
| 13 | | Plano | | 0.705 | | | | |
| 14 | Image | Plano | | — | | | | |

Note:
Reference wavelength (d-line) is 587.6 nm.
The effective radius of the surface 11 is 2.430 mm.

TABLE 8

Aspheric Coefficients

| | Surface # | | | | |
|---|---|---|---|---|---|
| | 2 | 3 | 4 | 5 | 6 |
| k = | −1.2514E+00 | −9.0000E+01 | −8.9482E+01 | −2.6588E+00 | 5.6347E+01 |
| A4 = | −1.5362E−02 | 2.3497E−02 | 3.2031E−01 | −9.8371E−02 | −1.2799E−01 |
| A6 = | −6.8169E−02 | 1.4782E−01 | −8.2337E−01 | 1.2941E−01 | −2.8798E−02 |
| A8 = | 3.9153E−01 | −1.3362E+00 | 1.6675E+00 | −3.4377E−02 | −8.6162E−03 |
| A10 = | −1.4119E+00 | 2.5562E+00 | −3.3245E+00 | −7.2599E−01 | 1.6186E−01 |
| A12 = | 2.1958E+00 | −2.7753E+00 | 3.9769E+00 | 1.2343E+00 | −4.8761E−01 |
| A14 = | −1.6917E+00 | 1.7598E+00 | −2.4023E+00 | −8.4170E−01 | 4.5181E−01 |
| A16 = | 4.9425E−01 | −5.1058E−01 | 5.7641E−01 | 2.2497E−01 | −1.2526E−01 |

TABLE 8-continued

Aspheric Coefficients

| Surface # | | | | |
|---|---|---|---|---|
| 7 | 8 | 9 | 10 | 11 |
| k = −2.5420E+00 | −1.4543E+00 | −9.0541E−01 | −2.0208E+00 | 2.9859E+01 |
| A4 = −1.0290E−01 | 3.6263E−01 | 2.0548E−01 | −1.5227E−01 | 4.7178E−02 |
| A6 = −7.3456E−02 | −1.5857E+00 | −5.3815E−01 | 8.7624E−02 | −6.0390E−02 |
| A8 = −1.0539E−01 | 2.6144E+00 | 6.8720E−01 | −4.2065E−02 | 2.8870E−02 |
| A10 = 4.3051E−01 | −2.0087E+00 | −4.2542E−01 | 1.3764E−02 | −8.6037E−03 |
| A12 = −5.1746E−01 | 6.3915E−01 | 1.3860E−01 | −3.0500E−03 | 1.5321E−03 |
| A14 = 3.0209E−01 | 2.6378E−02 | −2.2715E−02 | 4.0302E−04 | −1.4965E−04 |
| A16 = −6.6716E−02 | −4.1317E−02 | 1.7758E−03 | −2.2552E−05 | 6.0933E−06 |

In the 4th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 4th embodiment, so an explanation in this regard will not be provided again.

Moreover, these parameters can be calculated from Table 7 and Table 8 as the following values and satisfy the following conditions:

| 4th embodiment | | | |
|---|---|---|---|
| f [mm] | 3.62 | f/f2 | −0.25 |
| Fno | 2.06 | f/f4 | −1.57 |
| HFOV [deg.] | 40.0 | f3/f1 | 0.71 |
| (SAG31 + SAG32)/CT3 | −0.97 | f2/f5 | −5.29 |
| Z51/ΣAT | 0.32 | f3/f5 | 1.41 |
| f/R1 | 1.15 | |f/f4| + (f/f5) | 2.89 |
| f/(|R7| + |R8|) | 2.11 | | |

5th Embodiment

Figure 9:
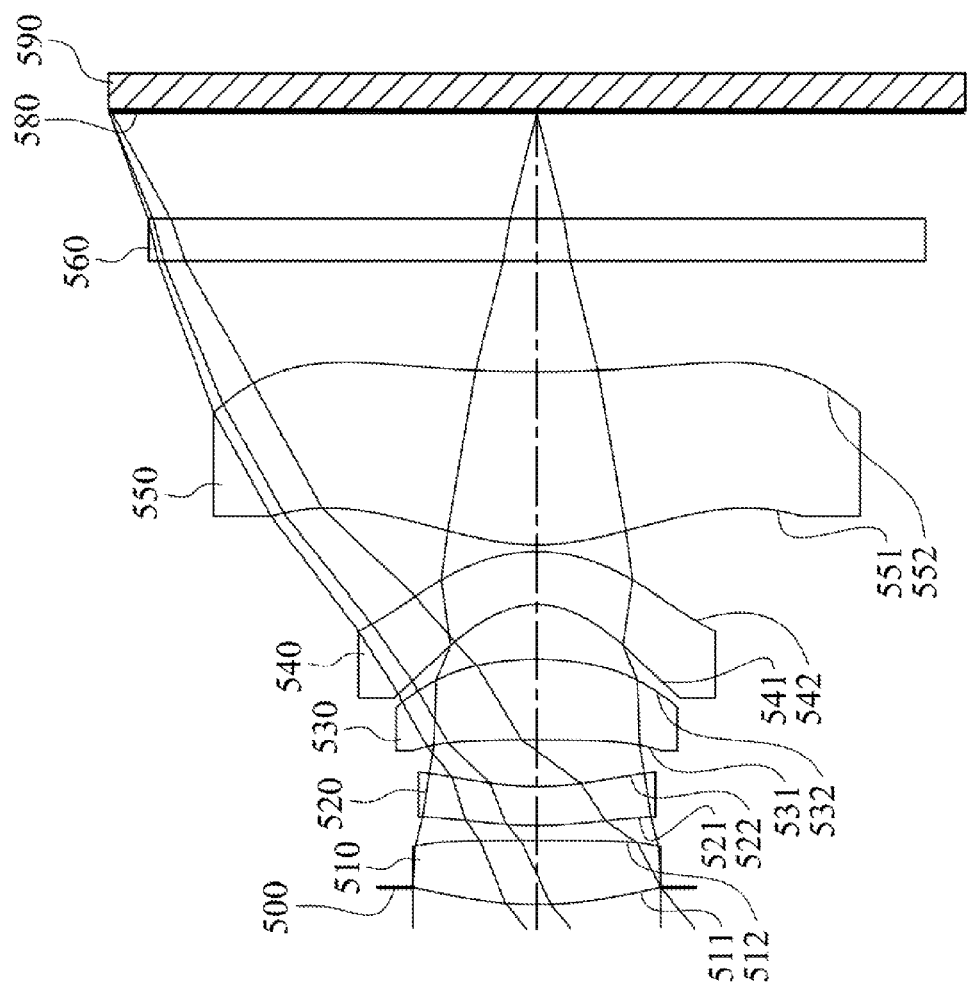
FIG. 9 is a schematic view of an image capturing device according to the 5th embodiment of the present disclosure.
Figure 10:
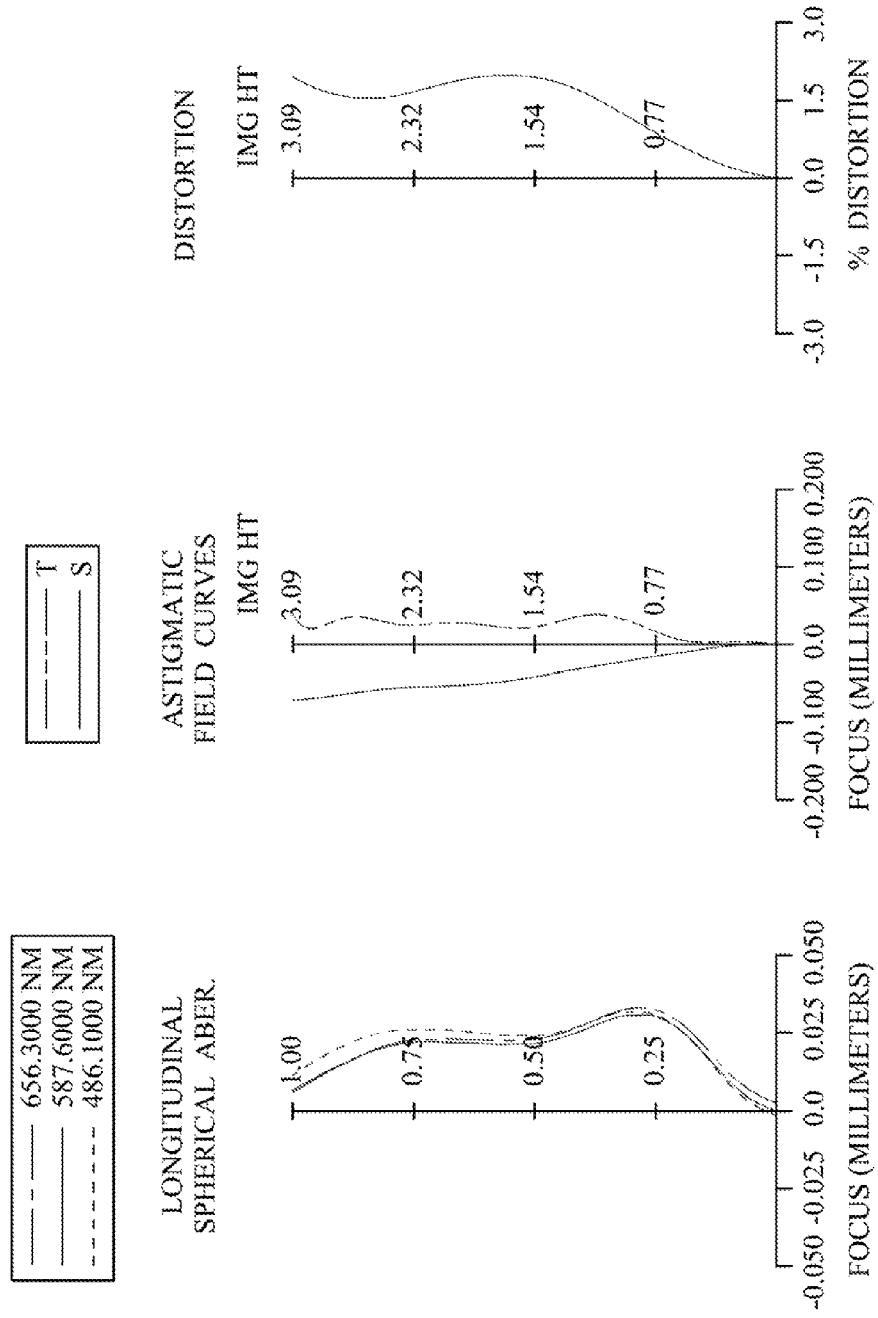
FIG. 10 shows, in order from left to right, spherical aberration curves, astigmatic field curves and a distortion curve of the image capturing device according to the 5th embodiment.

FIG. 9 is a schematic view of an image capturing device according to the 5th embodiment of the present disclosure. FIG. 10 shows, in order from left to right, spherical aberration curves, astigmatic field curves and a distortion curve of the image capturing device according to the 5th embodiment. In FIG. 9, the image capturing device includes an optical lens assembly and an image sensor 590. The optical lens assembly includes, in order from an object side to an image side, an aperture stop 500, a first lens element 510, a second lens element 520, a third lens element 530, a fourth lens element 540, a fifth lens element 550, an IR-cut filter 560 and an image plane 580, wherein the image sensor 590 is disposed on the image plane 580, and the optical lens assembly has a total of five lens elements (510-550) with refractive power.

The first lens element 510 with positive refractive power has an object-side surface 511 being convex in a paraxial region thereof and an image-side surface 512 being convex in a paraxial region thereof. The first lens element 510 is made of plastic material, and the object-side surface 511 and the image-side surface 512 of the first lens element 510 are aspheric.

The second lens element 520 with negative refractive power has an object-side surface 521 being convex in a paraxial region thereof and an image-side surface 522 being concave in a paraxial region thereof. The second lens element 520 is made of plastic material, and the object-side surface 521 and the image-side surface 522 of the second lens element 520 are aspheric. Furthermore, both of the object-side surface 521 and the image-side surface 522 of the second lens element 520 have at least one inflection point.

The third lens element 530 with positive refractive power has an object-side surface 531 being concave in a paraxial region thereof and an image-side surface 532 being convex in a paraxial region thereof. The third lens element 530 is made of plastic material, and the object-side surface 531 and the image-side surface 532 of the third lens element 530 are aspheric.

The fourth lens element 540 with negative refractive power has an object-side surface 541 being concave in a paraxial region thereof and an image-side surface 542 being convex in a paraxial region thereof. The fourth lens element 540 is made of plastic material, and the object-side surface 541 and the image-side surface 542 of the fourth lens element 540 are aspheric. Furthermore, both of the object-side surface 541 and the image-side surface 542 of the fourth lens element 540 have at least one inflection point.

The fifth lens element 550 with positive refractive power has an object-side surface 551 being convex in a paraxial region thereof and an image-side surface 552 being concave in a paraxial region thereof. The fifth lens element 550 is made of plastic material, and the object-side surface 551 and the image-side surface 552 of the fifth lens element 550 are aspheric. The image-side surface 552 of the fifth lens element 550 has at least one convex shape in an off-axis region thereof. Furthermore, both of the object-side surface 551 and the image-side surface 552 of the fifth lens element 550 have at least one inflection point in the off-axis region thereof.

The IR-cut filter 560 is made of glass and located between the fifth lens element 550 and the image plane 580, and will not affect the focal length of the optical lens assembly.

The detailed optical data of the 5th embodiment are shown in Table 9 and the aspheric surface data are shown in Table 10 below.

TABLE 9

5th Embodiment
f = 3.66 mm, Fno = 2.05, HFOV = 39.5 deg.

| Surface # | | Curvature Radius | Thickness | Material | Index | Abbe # | Focal Length |
|---|---|---|---|---|---|---|---|
| 0 | Object | Plano | Infinity | | | | |
| 1 | Ape. Stop | Plano | −0.122 | | | | |
| 2 | Lens 1 | 2.820 ASP | 0.461 | Plastic | 1.544 | 55.9 | 5.04 |

TABLE 9-continued

5th Embodiment
f = 3.66 mm, Fno = 2.05, HFOV = 39.5 deg.

| Surface # | | Curvature Radius | | Thickness | Material | Index | Abbe # | Focal Length |
|---|---|---|---|---|---|---|---|---|
| 3 | | −95.775 | ASP | 0.110 | | | | |
| 4 | Lens 2 | 3.155 | ASP | 0.280 | Plastic | 1.639 | 23.5 | −14.68 |
| 5 | | 2.280 | ASP | 0.336 | | | | |
| 6 | Lens 3 | −35.664 | ASP | 0.581 | Plastic | 1.544 | 55.9 | 4.36 |
| 7 | | −2.237 | ASP | 0.396 | | | | |
| 8 | Lens 4 | −0.585 | ASP | 0.380 | Plastic | 1.639 | 23.5 | −2.89 |
| 9 | | −1.074 | ASP | 0.050 | | | | |
| 10 | Lens 5 | 1.648 | ASP | 1.249 | Plastic | 1.544 | 55.9 | 3.29 |
| 11 | | 15.055 | ASP | 0.800 | | | | |
| 12 | IR-cut filter | Plano | | 0.300 | Glass | 1.517 | 64.2 | — |
| 13 | | Plano | | 0.782 | | | | |
| 14 | Image | Plano | | — | | | | |

Note:
Reference wavelength (d-line) is 587.6 nm.
The effective radius of the surface 11 is 2.330 mm.

TABLE 10

Aspheric Coefficients

| | Surface # | | | | |
|---|---|---|---|---|---|
| | 2 | 3 | 4 | 5 | 6 |
| k = | 1.4739E+00 | −9.0000E+01 | −8.9501E+01 | −2.5375E+00 | 5.6084E+01 |
| A4 = | −3.0607E−02 | −5.4434E−02 | 2.0298E−01 | −8.8035E−02 | −1.0199E−01 |
| A6 = | 8.2562E−02 | 5.5194E−02 | −8.2635E−01 | 4.7447E−02 | 1.3975E−01 |
| A8 = | −4.0922E−01 | −1.9302E−01 | 2.0350E+00 | −4.1782E−02 | −5.7039E−01 |
| A10 = | 9.4426E−01 | 2.0538E−01 | −3.6318E+00 | −1.8491E−01 | 1.1766E+00 |
| A12 = | −1.3552E+00 | −1.9758E−01 | 3.9379E+00 | 3.4235E−01 | −1.4416E+00 |
| A14 = | 1.0455E+00 | 1.5965E−01 | −2.3137E+00 | −2.5222E−01 | 8.9104E−01 |
| A16 = | −3.4628E−01 | −7.2472E−02 | 5.5518E−01 | 7.2031E−02 | −2.0522E−01 |

| | Surface # | | | | |
|---|---|---|---|---|---|
| | 7 | 8 | 9 | 10 | 11 |
| k = | −2.3176E+00 | −1.4837E+00 | −9.8738E−01 | −1.6460E+00 | 3.6034E+01 |
| A4 = | −1.7929E−01 | 1.0599E−01 | 1.2738E−01 | −1.5155E−01 | 3.9043E−02 |
| A6 = | 1.3288E−01 | −6.2560E−01 | −2.5078E−01 | 9.7755E−02 | −3.9235E−02 |
| A8 = | −2.8485E−01 | 1.2419E+00 | 3.3971E−01 | −5.5174E−02 | 1.4836E−02 |
| A10 = | 3.3299E−01 | −1.2130E+00 | −2.0873E−01 | 2.0323E−02 | −3.7747E−03 |
| A12 = | −1.0866E−01 | 7.5247E−01 | 6.1473E−02 | −4.5978E−03 | 6.1461E−04 |
| A14 = | −4.8608E−02 | −3.0281E−01 | −6.9672E−03 | 5.7819E−04 | −5.7685E−05 |
| A16 = | 2.8379E−02 | 5.8052E−02 | 1.1041E−04 | −3.0289E−05 | 2.3230E−06 |

In the 5th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 5th embodiment, so an explanation in this regard will not be provided again.

Moreover, these parameters can be calculated from Table 9 and Table 10 as the following values and satisfy the following conditions:

| 5th embodiment | | | |
|---|---|---|---|
| f [mm] | 3.66 | f/f2 | −0.25 |
| Fno | 2.05 | f/f4 | −1.27 |
| HFOV [deg.] | 39.5 | f3/f1 | 0.87 |
| (SAG31 + SAG32)/CT3 | −0.74 | f2/f5 | −4.46 |

| 5th embodiment | | | |
|---|---|---|---|
| Z51/ΣAT | 0.30 | f3/f5 | 1.33 |
| f/R1 | 1.30 | |f/f4| + (f/f5) | 2.38 |
| f/(|R7| + |R8|) | 2.21 | | |

6th Embodiment

Figure 11:
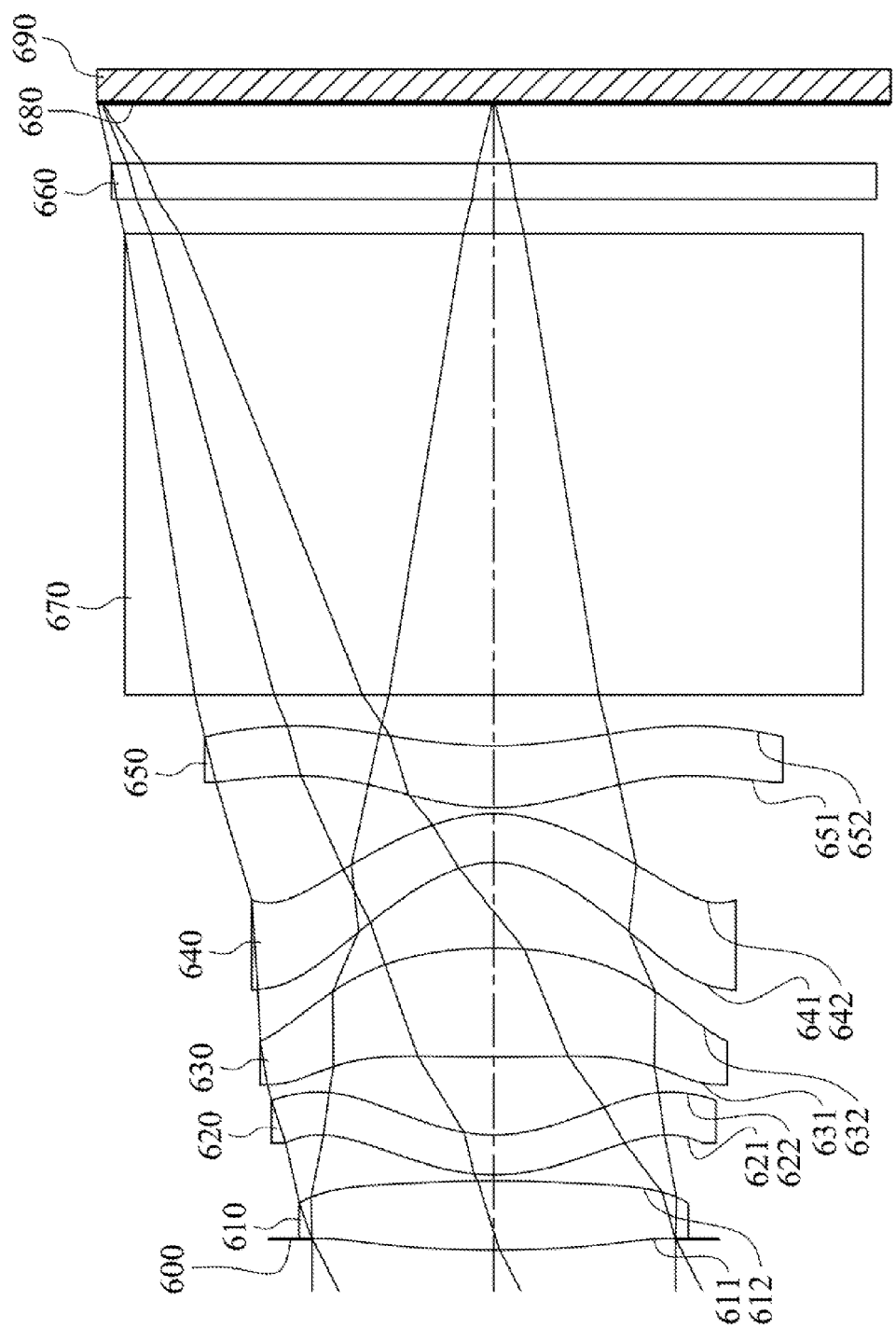
FIG. 11 is a schematic view of an image capturing device according to the 6th embodiment of the present disclosure.
Figure 12:
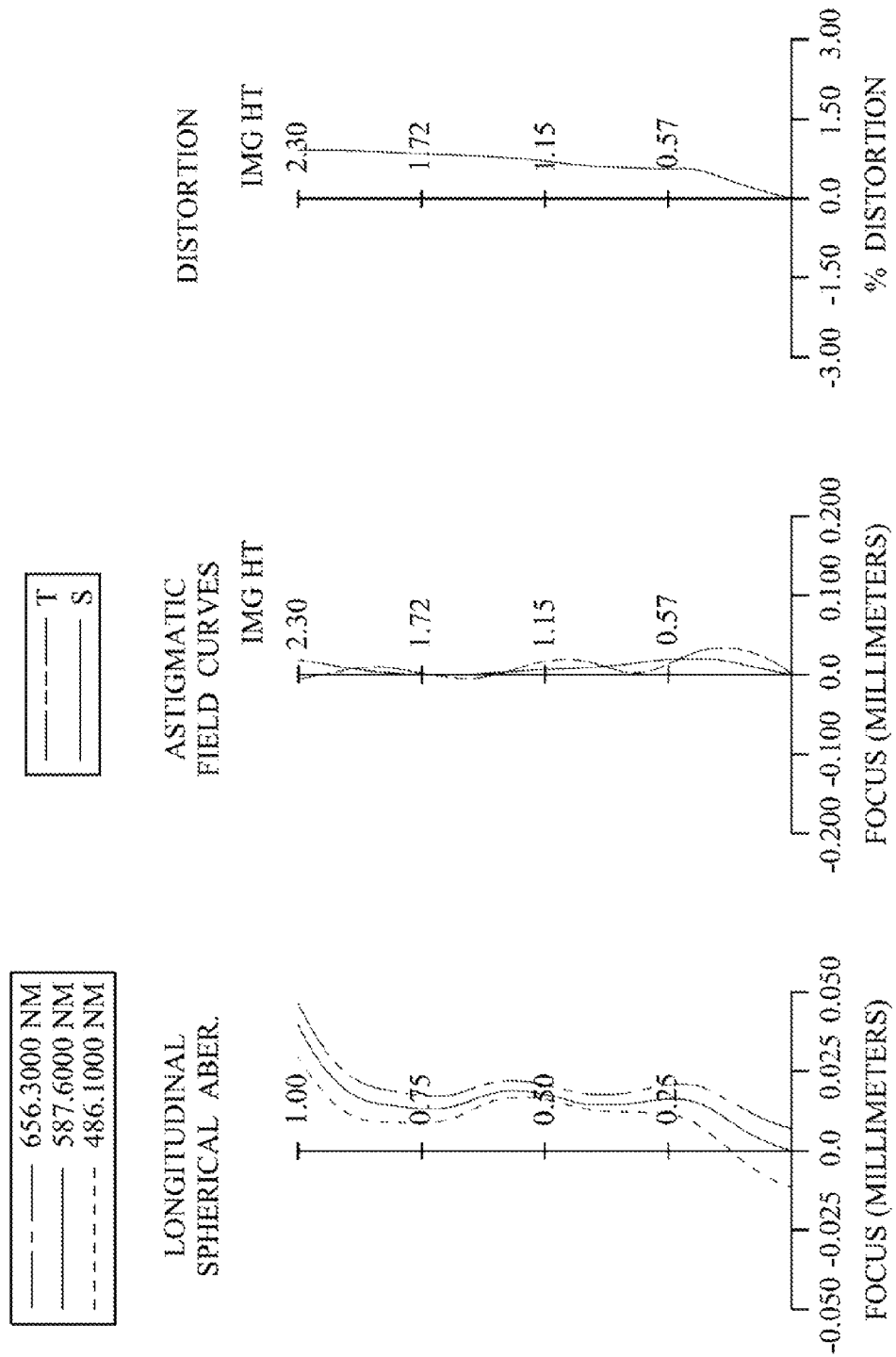
FIG. 12 shows, in order from left to right, spherical aberration curves, astigmatic field curves and a distortion curve of the image capturing device according to the 6th embodiment.

FIG. 11 is a schematic view of an image capturing device according to the 6th embodiment of the present disclosure. FIG. 12 shows, in order from left to right, spherical aberration curves, astigmatic field curves and a distortion curve of the image capturing device according to the 6th embodiment. In FIG. 11, the image capturing device includes an optical lens assembly and an image sensor 690. The optical lens assembly includes, in order from an object side to an image side, an aperture stop 600, a first lens element 610, a second lens element 620, a third lens element 630, a fourth lens element 640, a fifth lens element 650, an IR-cut filter 660, a prism 670 and an image plane 680, wherein the image sensor 690 is disposed on the image plane 680, and the optical lens assembly has a total of five lens elements (610-650) with refractive power.

The first lens element 610 with positive refractive power has an object-side surface 611 being convex in a paraxial region thereof and an image-side surface 612 being convex in a paraxial region thereof. The first lens element 610 is made of plastic material, and the object-side surface 611 and the image-side surface 612 of the first lens element 610 are aspheric.

The second lens element 620 with negative refractive power has an object-side surface 621 being convex in a paraxial region thereof and an image-side surface 622 being concave in a paraxial region thereof. The second lens element 620 is made of plastic material, and the object-side surface 621 and the image-side surface 622 of the second lens element 620 are aspheric. Furthermore, both of the object-side surface 621 and the image-side surface 622 of the second lens element 620 have at least one inflection point.

The third lens element 630 with positive refractive power has an object-side surface 631 being convex in a paraxial region thereof and an image-side surface 632 being convex in a paraxial region thereof. The third lens element 630 is made of plastic material, and the object-side surface 631 and the image-side surface 632 of the third lens element 630 are aspheric. Furthermore, both of the object-side surface 631 and the image-side surface 632 of the third lens element 630 have at least one inflection point.

The fourth lens element 640 with negative refractive power has an object-side surface 641 being concave in a paraxial region thereof and an image-side surface 642 being convex in a paraxial region thereof. The fourth lens element 640 is made of plastic material, and the object-side surface 641 and the image-side surface 642 of the fourth lens element 640 are aspheric. Furthermore, both of the object-side surface 641 and the image-side surface 642 of the fourth lens element 640 have at least one inflection point.

The fifth lens element 650 with positive refractive power has an object-side surface 651 being convex in a paraxial region thereof and an image-side surface 652 being concave in a paraxial region thereof. The fifth lens element 650 is made of plastic material, and the object-side surface 651 and the image-side surface 652 of the fifth lens element 650 are aspheric. The image-side surface 652 of the fifth lens element 650 has at least one convex shape in an off-axis region thereof. Furthermore, both of the object-side surface 651 and the image-side surface 652 of the fifth lens element 650 have at least one inflection point in the off-axis region thereof.

The prism 670 and the IR-cut filter 660 are made of glass and located between the fifth lens element 650 and the image plane 680 in order from the object side to the image side, and will not affect the focal length of the optical lens assembly.

The detailed optical data of the 6th embodiment are shown in Table 11 and the aspheric surface data are shown in Table 12 below.

TABLE 11

6th Embodiment
f = 4.35 mm, Fno = 2.04, HFOV = 27.6 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.065 | | | | |
| 2 | Lens 1 | 9.018 | ASP | 0.408 | Plastic | 1.544 | 55.9 | 6.66 |
| 3 | | −5.969 | ASP | 0.035 | | | | |
| 4 | Lens 2 | 1.143 | ASP | 0.230 | Plastic | 1.639 | 23.5 | −11.74 |
| 5 | | 0.914 | ASP | 0.458 | | | | |
| 6 | Lens 3 | 10.460 | ASP | 0.640 | Plastic | 1.544 | 55.9 | 3.77 |
| 7 | | −2.498 | ASP | 0.500 | | | | |
| 8 | Lens 4 | −0.546 | ASP | 0.287 | Plastic | 1.639 | 23.5 | −3.57 |
| 9 | | −0.865 | ASP | 0.035 | | | | |
| 10 | Lens 5 | 1.361 | ASP | 0.362 | Plastic | 1.544 | 55.9 | 4.90 |
| 11 | | 2.518 | ASP | 0.300 | | | | |
| 12 | Prism | Plano | | 2.700 | Glass | 1.517 | 64.2 | — |
| 13 | | Plano | | 0.200 | | | | |
| 14 | IR-cut filter | Plano | | 0.210 | Glass | 1.517 | 64.2 | — |
| 15 | | Plano | | 0.354 | | | | |
| 16 | Image | Plano | | — | | | | |

Note:
Reference wavelength (d-line) is 587.6 nm.

TABLE 12

Aspheric Coefficients

| | Surface # | | | | |
|---|---|---|---|---|---|
| | 2 | 3 | 4 | 5 | 6 |
| k = | 2.5870E+01 | 4.8204E+00 | −6.4281E+00 | −4.5869E+00 | 4.8449E+01 |
| A4 = | 9.5545E−02 | 1.4182E−01 | 1.3338E−01 | 5.1134E−02 | −1.0557E−01 |
| A6 = | −1.7616E−01 | −2.0205E−01 | −3.6812E−01 | −2.7305E−01 | −3.4867E−02 |

TABLE 12-continued

Aspheric Coefficients

| | | | | | |
|---|---|---|---|---|---|
| A8 = | 2.1283E−01 | 1.3056E−01 | 4.5435E−01 | 3.4453E−01 | −1.2199E−02 |
| A10 = | −2.0101E−01 | −6.8246E−02 | −4.2653E−01 | −3.5987E−01 | 2.9654E−03 |
| A12 = | 9.8741E−02 | 1.4479E−02 | 2.0843E−01 | 2.0319E−01 | 3.0703E−02 |
| A14 = | −2.2261E−02 | | −3.9124E−02 | −4.2754E−02 | −1.1543E−02 |

| | Surface # | | | | |
|---|---|---|---|---|---|
| | 7 | 8 | 9 | 10 | 11 |
| k = | 1.7098E+00 | −2.8091E+00 | −4.7336E+00 | −1.8990E+00 | −2.9917E+01 |
| A4 = | −7.3412E−02 | −1.8683E−01 | −1.5668E−01 | −2.8422E−01 | 5.5272E−02 |
| A6 = | −1.1828E−02 | 9.4081E−02 | 1.0713E−01 | 2.9567E−01 | −9.8203E−02 |
| A8 = | −1.3773E−02 | 5.2341E−02 | 3.6139E−04 | −2.9320E−01 | 4.3561E−02 |
| A10 = | 5.9809E−02 | −4.8243E−02 | −3.9682E−02 | 1.7730E−01 | −9.5708E−03 |
| A12 = | −3.3021E−02 | 1.8819E−02 | 2.9501E−02 | −5.8069E−02 | 2.6355E−03 |
| A14 = | 6.5079E−03 | −3.5679E−03 | −6.4554E−03 | 9.5161E−03 | −8.9279E−04 |
| A16 = | | | | −6.0414E−04 | 1.1843E−04 |

In the 6th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 6th embodiment, so an explanation in this regard will not be provided again.

Moreover, these parameters can be calculated from Table 11 and Table 12 as the following values and satisfy the following conditions:

| 6th embodiment | | | |
|---|---|---|---|
| f [mm] | 4.35 | f/f2 | −0.37 |
| Fno | 2.04 | f/f4 | −1.22 |
| HFOV [deg.] | 27.6 | f3/f1 | 0.57 |
| (SAG31 + SAG32)/CT3 | −1.11 | f2/f5 | −2.40 |
| Z51/ΣAT | 0.18 | f3/f5 | 0.77 |
| f/R1 | 0.48 | |f/f4| + (f/f5) | 2.11 |
| f/(|R7| + |R8|) | 3.08 | | |

7th Embodiment

Figure 13:
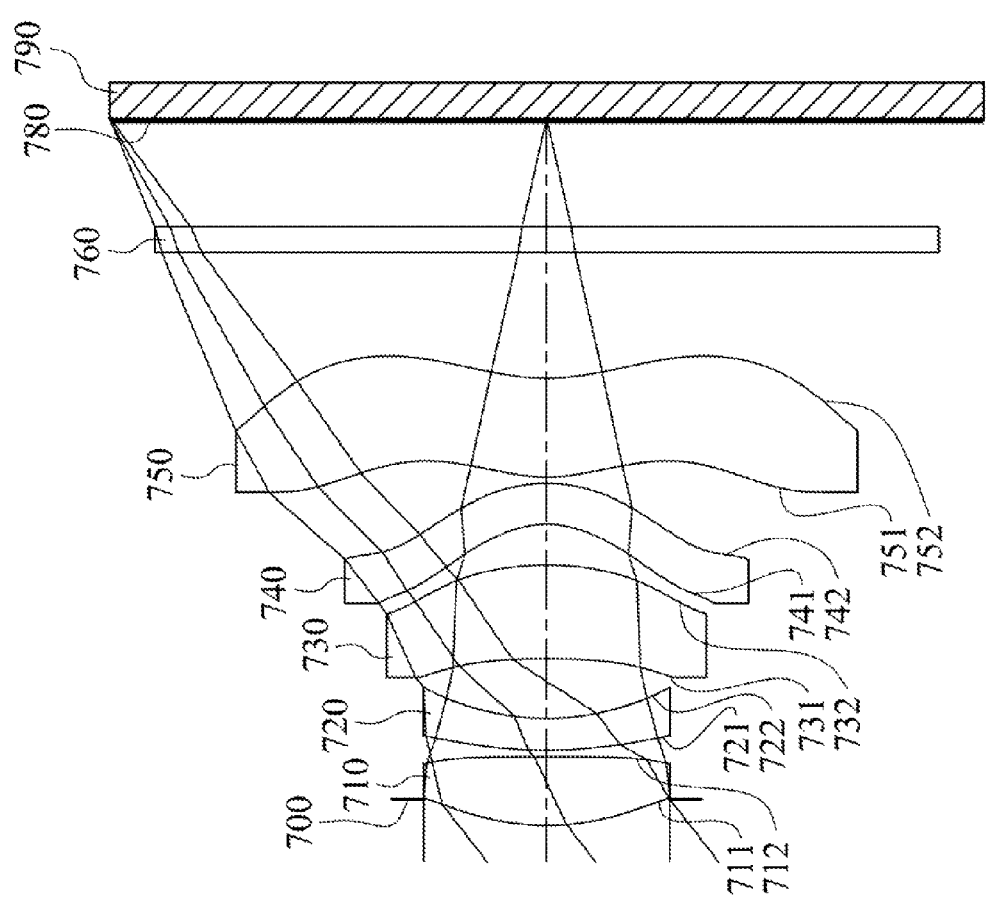
FIG. 13 is a schematic view of an image capturing device according to the 7th embodiment of the present disclosure.
Figure 14:
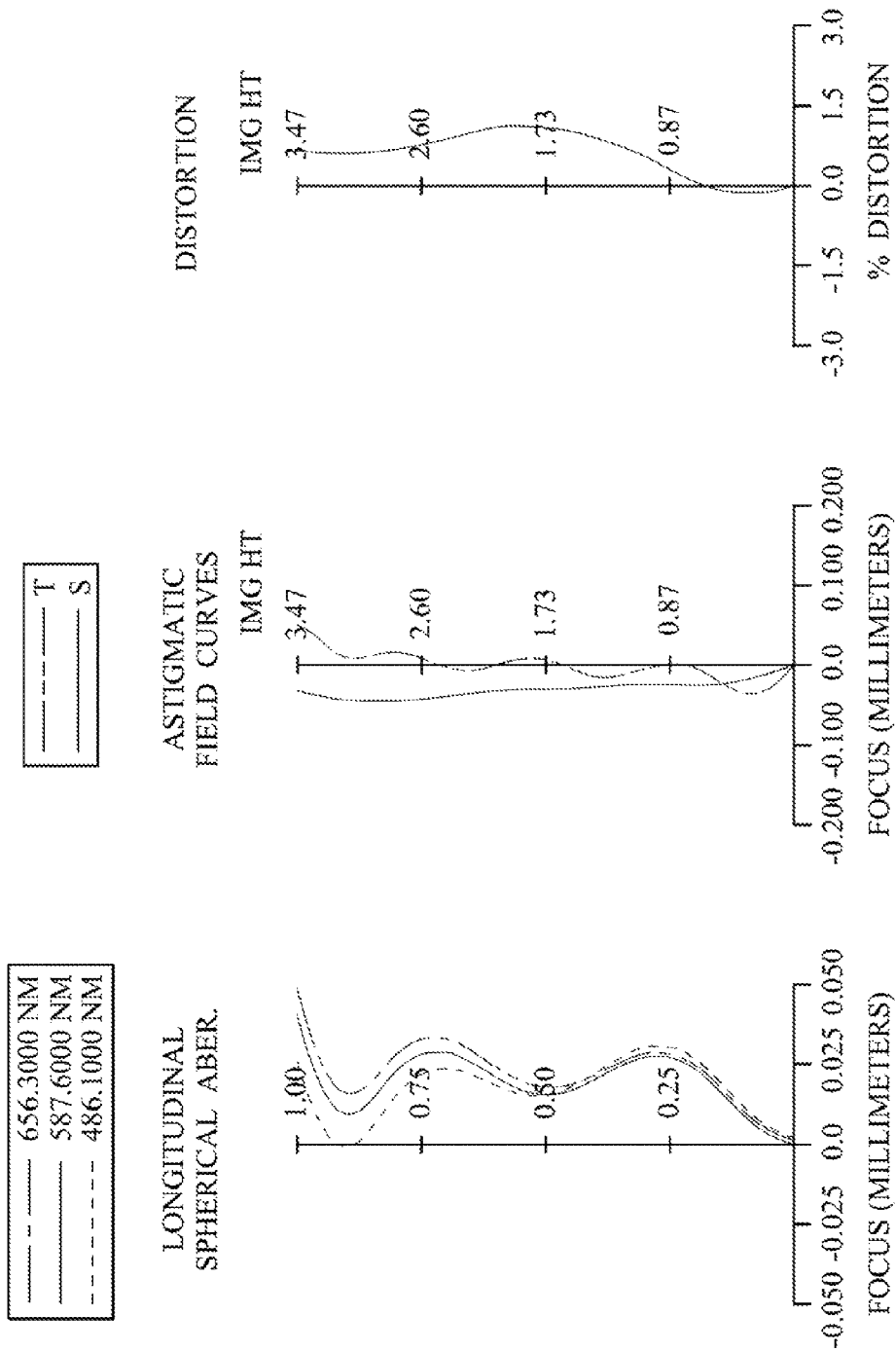
FIG. 14 shows, in order from left to right, spherical aberration curves, astigmatic field curves and a distortion curve of the image capturing device according to the 7th embodiment.

FIG. 13 is a schematic view of an image capturing device according to the 7th embodiment of the present disclosure. FIG. 14 shows, in order from left to right, spherical aberration curves, astigmatic field curves and a distortion curve of the image capturing device according to the 7th embodiment. In FIG. 13, the image capturing device includes an optical lens assembly and an image sensor 790. The optical lens assembly includes, in order from an object side to an image side, an aperture stop 700, a first lens element 710, a second lens element 720, a third lens element 730, a fourth lens element 740, a fifth lens element 750, an IR-cut filter 760 and an image plane 780, wherein the image sensor 790 is disposed on the image plane 780, and the optical lens assembly has a total of five lens elements (710-750) with refractive power.

The first lens element 710 with positive refractive power has an object-side surface 711 being convex in a paraxial region thereof and an image-side surface 712 being convex in a paraxial region thereof. The first lens element 710 is made of plastic material, and the object-side surface 711 and the image-side surface 712 of the first lens element 710 are aspheric.

The second lens element 720 with negative refractive power has an object-side surface 721 being convex in a paraxial region thereof and an image-side surface 722 being concave in a paraxial region thereof. The second lens element 720 is made of plastic material, and the object-side surface 721 and the image-side surface 722 of the second lens element 720 are aspheric.

The third lens element 730 with positive refractive power has an object-side surface 731 being concave in a paraxial region thereof and an image-side surface 732 being convex in a paraxial region thereof. The third lens element 730 is made of plastic material, and the object-side surface 731 and the image-side surface 732 of the third lens element 730 are aspheric. Furthermore, both of the object-side surface 731 and the image-side surface 732 of the third lens element 730 have at least one inflection point.

The fourth lens element 740 with negative refractive power has an object-side surface 741 being concave in a paraxial region thereof and an image-side surface 742 being convex in a paraxial region thereof. The fourth lens element 740 is made of plastic material, and the object-side surface 741 and the image-side surface 742 of the fourth lens element 740 are aspheric. Furthermore, both of the object-side surface 741 and the image-side surface 742 of the fourth lens element 740 have at least one inflection point.

The fifth lens element 750 with positive refractive power has an object-side surface 751 being convex in a paraxial region thereof and an image-side surface 752 being concave in a paraxial region thereof. The fifth lens element 750 is made of plastic material, and the object-side surface 751 and the image-side surface 752 of the fifth lens element 750 are aspheric. The image-side surface 752 of the fifth lens element 750 has at least one convex shape in an off-axis region thereof. Furthermore, both of the object-side surface 751 and the image-side surface 752 of the fifth lens element 750 have at least one inflection point in the off-axis region thereof.

The IR-cut filter 760 is made of glass and located between the fifth lens element 750 and the image plane 780, and will not affect the focal length of the optical lens assembly.

The detailed optical data of the 7th embodiment are shown in Table 13 and the aspheric surface data are shown in Table 14 below.

TABLE 13

7th Embodiment
f = 4.40 mm, Fno = 2.25, HFOV = 38.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.208 | | | | |
| 2 | Lens 1 | 2.014 | ASP | 0.546 | Plastic | 1.544 | 55.9 | 3.67 |
| 3 | | −189.507 | ASP | 0.050 | | | | |
| 4 | Lens 2 | 2.953 | ASP | 0.250 | Plastic | 1.640 | 23.3 | −8.49 |
| 5 | | 1.850 | ASP | 0.480 | | | | |
| 6 | Lens 3 | −6.004 | ASP | 0.745 | Plastic | 1.544 | 55.9 | 6.51 |
| 7 | | −2.325 | ASP | 0.326 | | | | |
| 8 | Lens 4 | −0.705 | ASP | 0.320 | Plastic | 1.640 | 23.3 | −3.68 |
| 9 | | −1.184 | ASP | 0.050 | | | | |
| 10 | Lens 5 | 1.226 | ASP | 0.788 | Plastic | 1.544 | 55.9 | 4.96 |
| 11 | | 1.739 | ASP | 1.000 | | | | |
| 12 | IR-cut filter | Plano | | 0.210 | Glass | 1.517 | 64.2 | — |
| 13 | | Plano | | 0.844 | | | | |
| 14 | Image | Plano | | — | | | | |

Note:
Reference wavelength (d-line) is 587.6 nm
The effective radius of the surface 5 is 0.980 mm.

TABLE 14

Aspheric Coefficients

| | Surface # | | | | |
|---|---|---|---|---|---|
| | 2 | 3 | 4 | 5 | 6 |
| k = | −7.9489E−01 | −1.0000E+00 | −5.6344E+01 | −5.1325E+00 | −1.9178E+01 |
| A4 = | −3.4353E−03 | −1.0040E−01 | 7.4017E−02 | −6.3195E−03 | −7.1752E−02 |
| A6 = | 2.7722E−02 | 2.1140E−01 | −1.2309E−01 | 1.1751E−01 | −7.1090E−02 |
| A8 = | −9.6163E−02 | −3.2382E−01 | 2.7177E−01 | −1.3375E−01 | 2.0135E−01 |
| A10 = | 9.6005E−02 | 2.0155E−01 | −4.1871E−01 | 7.3454E−02 | −2.7255E−01 |
| A12 = | −5.2925E−02 | −5.7119E−02 | 3.2029E−01 | −1.2297E−02 | 1.4443E−01 |
| A14 = | | | −9.1976E−02 | 6.8297E−03 | |

| | Surface # | | | | |
|---|---|---|---|---|---|
| | 7 | 8 | 9 | 10 | 11 |
| k = | −3.9284E+01 | −6.1323E+00 | −8.1505E+00 | −1.0142E+01 | −4.4956E+00 |
| A4 = | −3.7446E−01 | −6.2888E−01 | −4.6076E−01 | −1.2765E−01 | −1.0549E−01 |
| A6 = | 5.6558E−01 | 1.3082E+00 | 6.5344E−01 | 5.3443E−02 | 4.1924E−02 |
| A8 = | −8.6341E−01 | −2.1868E+00 | −6.7532E−01 | −3.1538E−02 | −1.5272E−02 |
| A10 = | 8.7286E−01 | 2.5540E+00 | 5.0448E−01 | 1.4469E−02 | 3.8696E−03 |
| A12 = | −4.4606E−01 | −1.7040E+00 | −2.1969E−01 | −3.4738E−03 | −6.1625E−04 |
| A14 = | 8.9185E−02 | 5.8703E−01 | 4.9196E−02 | 4.0861E−04 | 5.4054E−05 |
| A16 = | | −8.2100E−02 | −4.4239E−03 | −1.8883E−05 | −1.9277E−06 |

In the 7th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 7th embodiment, so an explanation in this regard will not be provided again.

Moreover, these parameters can be calculated from Table 13 and Table 14 as the following values and satisfy the following conditions:

| 7th embodiment | | | |
|---|---|---|---|
| f [mm] | 4.40 | f/f2 | −0.52 |
| Fno | 2.25 | f/f4 | −1.20 |
| HFOV [deg.] | 38.0 | f3/f1 | 1.77 |
| (SAG31 + SAG32)/CT3 | −0.73 | f2/f5 | −1.71 |
| Z51/ΣAT | 0.14 | f3/f5 | 1.31 |
| f/R1 | 2.19 | |f/f4| + (f/f5) | 2.08 |
| f/(|R7| + |R8|) | 2.33 | | |

8th Embodiment

Figure 15:
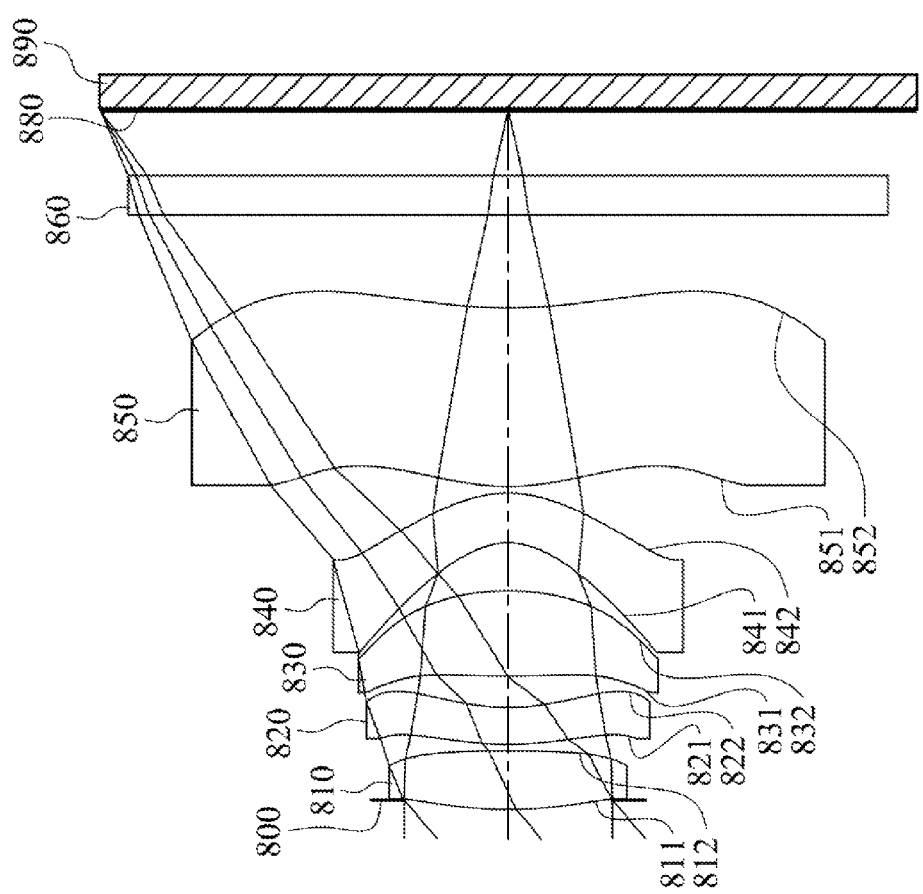
FIG. 15 is a schematic view of an image capturing device according to the 8th embodiment of the present disclosure.
Figure 16:
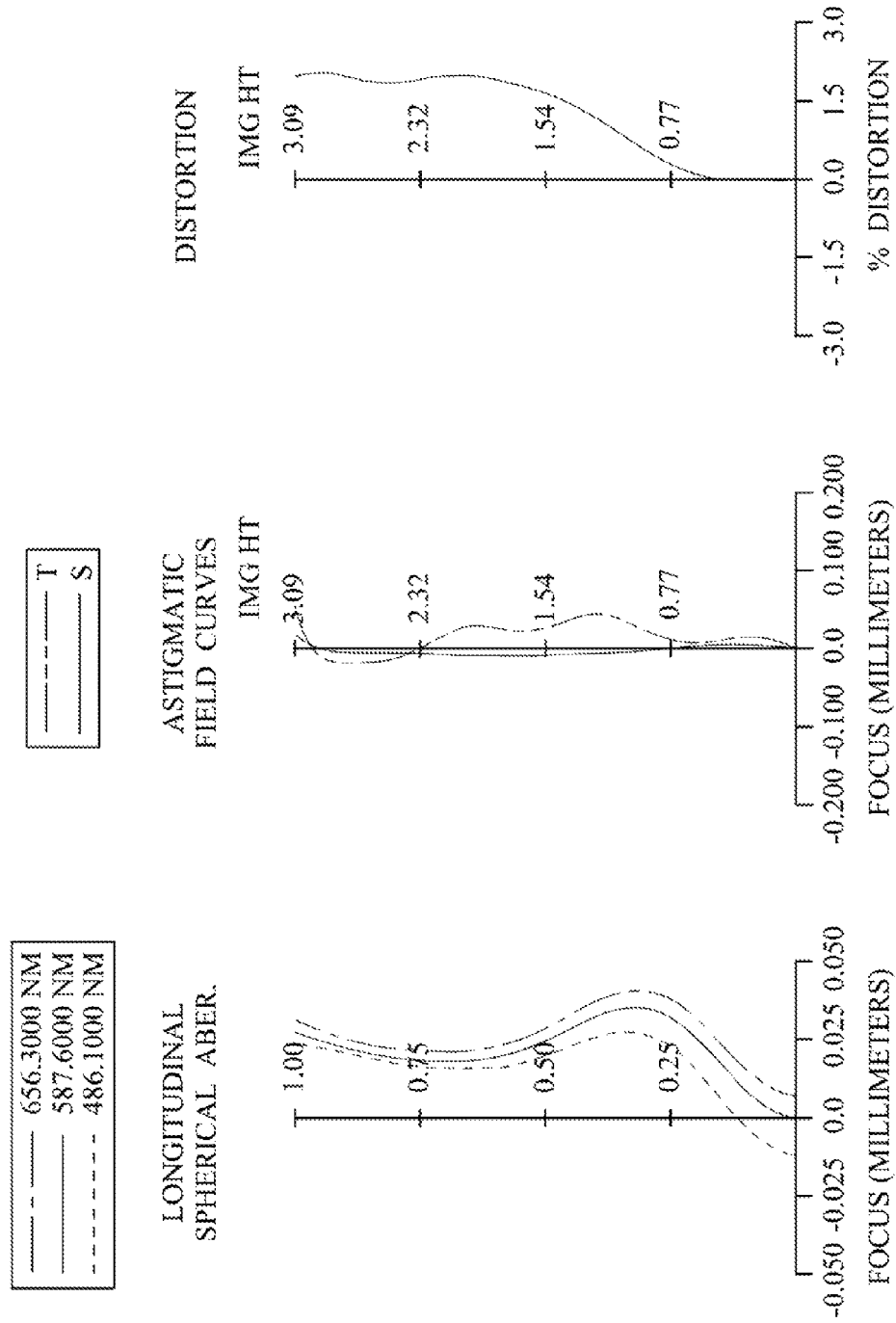
FIG. 16 shows, in order from left to right, spherical aberration curves, astigmatic field curves and a distortion curve of the image capturing device according to the 8th embodiment.

FIG. 15 is a schematic view of an image capturing device according to the 8th embodiment of the present disclosure. FIG. 16 shows, in order from left to right, spherical aberration curves, astigmatic field curves and a distortion curve of the image capturing device according to the 8th embodiment. In FIG. 15, the image capturing device includes an optical lens assembly and an image sensor 890. The optical lens assembly includes, in order from an object side to an image side, an aperture stop 800, a first lens element 810, a second lens element 820, a third lens element 830, a fourth lens element 840, a fifth lens element 850, an IR-cut filter 860 and an image plane 880, wherein the image sensor 890 is disposed on the image plane 880, and the optical lens assembly has a total of five lens elements (810-850) with refractive power.

The first lens element 810 with positive refractive power has an object-side surface 811 being convex in a paraxial region thereof and an image-side surface 812 being convex in a paraxial region thereof. The first lens element 810 is made of plastic material, and the object-side surface 811 and the image-side surface 812 of the first lens element 810 are aspheric.

The second lens element 820 with negative refractive power has an object-side surface 821 being convex in a paraxial region thereof and an image-side surface 822 being concave in a paraxial region thereof. The second lens element 820 is made of plastic material, and the object-side surface 821 and the image-side surface 822 of the second lens element 820 are aspheric. Furthermore, both of the object-side surface 821 and the image-side surface 822 of the second lens element 820 have at least one inflection point.

The third lens element 830 with positive refractive power has an object-side surface 831 being convex in a paraxial region thereof and an image-side surface 832 being convex in a paraxial region thereof. The third lens element 830 is made of plastic material, and the object-side surface 831 and the image-side surface 832 of the third lens element 830 are aspheric. Furthermore, both of the object-side surface 831 and the image-side surface 832 of the third lens element 830 have at least one inflection point.

The fourth lens element 840 with negative refractive power has an object-side surface 841 being concave in a paraxial region thereof and an image-side surface 842 being convex in a paraxial region thereof. The fourth lens element 840 is made of plastic material, and the object-side surface 841 and the image-side surface 842 of the fourth lens element 840 are aspheric. Furthermore, both of the object-side surface 841 and the image-side surface 842 of the fourth lens element 840 have at least one inflection point.

The fifth lens element 850 with positive refractive power has an object-side surface 851 being convex in a paraxial region thereof and an image-side surface 852 being concave in a paraxial region thereof. The fifth lens element 850 is made of plastic material, and the object-side surface 851 and the image-side surface 852 of the fifth lens element 850 are aspheric. The image-side surface 852 of the fifth lens element 850 has at least one convex shape in an off-axis region thereof. Furthermore, both of the object-side surface 851 and the image-side surface 852 of the fifth lens element 850 have at least one inflection point in the off-axis region thereof.

The IR-cut filter 860 is made of glass and located between the fifth lens element 850 and the image plane 880, and will not affect the focal length of the optical lens assembly.

The detailed optical data of the 8th embodiment are shown in Table 15 and the aspheric surface data are shown in Table 16 below

TABLE 15

8th Embodiment
f = 3.60 mm, Fno = 2.28, HFOV = 40.0 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.073 | | | | |
| 2 | Lens 1 | 3.020 | ASP | 0.446 | Plastic | 1.544 | 55.9 | 4.55 |
| 3 | | −12.971 | ASP | 0.050 | | | | |
| 4 | Lens 2 | 2.338 | ASP | 0.280 | Plastic | 1.607 | 26.6 | −10.00 |
| 5 | | 1.611 | ASP | 0.234 | | | | |
| 6 | Lens 3 | 9.092 | ASP | 0.649 | Plastic | 1.514 | 56.8 | 3.13 |
| 7 | | −1.906 | ASP | 0.361 | | | | |
| 8 | Lens 4 | −0.495 | ASP | 0.380 | Plastic | 1.607 | 26.6 | −3.22 |
| 9 | | −0.856 | ASP | 0.050 | | | | |
| 10 | Lens 5 | 1.789 | ASP | 1.353 | Plastic | 1.530 | 55.8 | 5.43 |
| 11 | | 3.489 | ASP | 0.700 | | | | |
| 12 | IR-cut filter | Plano | | 0.300 | Glass | 1.517 | 64.2 | — |
| 13 | | Plano | | 0.499 | | | | |
| 14 | Image | Plano | | — | | | | |

Note:
Reference wavelength (d-line) is 587.6 nm.

TABLE 16

Aspheric Coefficients

| | Surface # | | | | |
|---|---|---|---|---|---|
| | 2 | 3 | 4 | 5 | 6 |
| k = | 3.7752E+00 | 8.9874E+01 | −4.4319E+01 | −4.7662E+00 | 5.7007E+01 |
| A4 = | −3.9971E−02 | −6.9702E−02 | 1.8852E−01 | −1.0709E−01 | −1.2956E−01 |
| A6 = | 3.1579E−02 | 4.4651E−02 | −8.4392E−01 | 4.8530E−02 | 1.0575E−01 |
| A8 = | −4.0484E−01 | −2.6298E−01 | 2.0441E+00 | −4.8564E−02 | −5.7918E−01 |

TABLE 16-continued

| Aspheric Coefficients | | | | |
|---|---|---|---|---|
| A10 = 9.4789E−01 | 2.9367E−01 | −3.6208E+00 | −2.0101E−01 | 1.1772E+00 |
| A12 = −1.3896E+00 | −2.3966E−01 | 3.9376E+00 | 3.3678E−01 | −1.4203E+00 |
| A14 = 1.0455E+00 | 1.5965E−01 | −2.3389E+00 | −2.6026E−01 | 9.0584E−01 |
| A16 = −3.4628E−01 | −7.2472E−02 | 5.5296E−01 | 7.9718E−02 | −2.2033E−01 |

| Surface # | | | | |
|---|---|---|---|---|
| 7 | 8 | 9 | 10 | 11 |
| k = −8.0599E+00 | −2.0240E+00 | −1.4115E+00 | −1.8667E+00 | −9.0000E+01 |
| A4 = −2.0817E−01 | 9.7552E−02 | 4.1936E−01 | −1.3203E−01 | 6.8448E−02 |
| A6 = 1.1482E−01 | −6.7077E−01 | −7.7023E−01 | −3.8464E−03 | −7.5635E−02 |
| A8 = −2.8066E−01 | 1.2111E+00 | 8.2426E−01 | 5.2906E−02 | 3.7149E−02 |
| A10 = 3.1418E−01 | −1.2206E+00 | −4.4949E−01 | −4.4970E−02 | −1.1296E−02 |
| A12 = −1.2652E−01 | 7.4976E−01 | 7.9936E−02 | 1.7574E−02 | 2.0501E−03 |
| A14 = −5.0863E−02 | −3.0622E−01 | 2.7550E−02 | −3.2232E−03 | −2.0208E−04 |
| A16 = 4.6179E−02 | 7.1923E−02 | −9.6533E−03 | 2.2545E−04 | 8.3112E−06 |

In the 8th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 8th embodiment, so an explanation in this regard will not be provided again.

Moreover, these parameters can be calculated from Table 15 and Table 16 as the following values and satisfy the following conditions:

| 8th embodiment | | | |
|---|---|---|---|
| f [mm] | 3.60 | f/f2 | −0.36 |
| Fno | 2.28 | f/f4 | −1.12 |
| HFOV [deg.] | 40.0 | f3/f1 | 0.69 |
| (SAG31 + SAG32)/CT3 | −0.99 | f2/f5 | −1.84 |
| Z51/ΣAT | 0.22 | f3/f5 | 0.58 |
| f/R1 | 1.19 | |f/f4| + (f/f5) | 1.78 |
| f/(|R7| + |R8|) | 2.66 | | |

9th Embodiment

Figure 17:
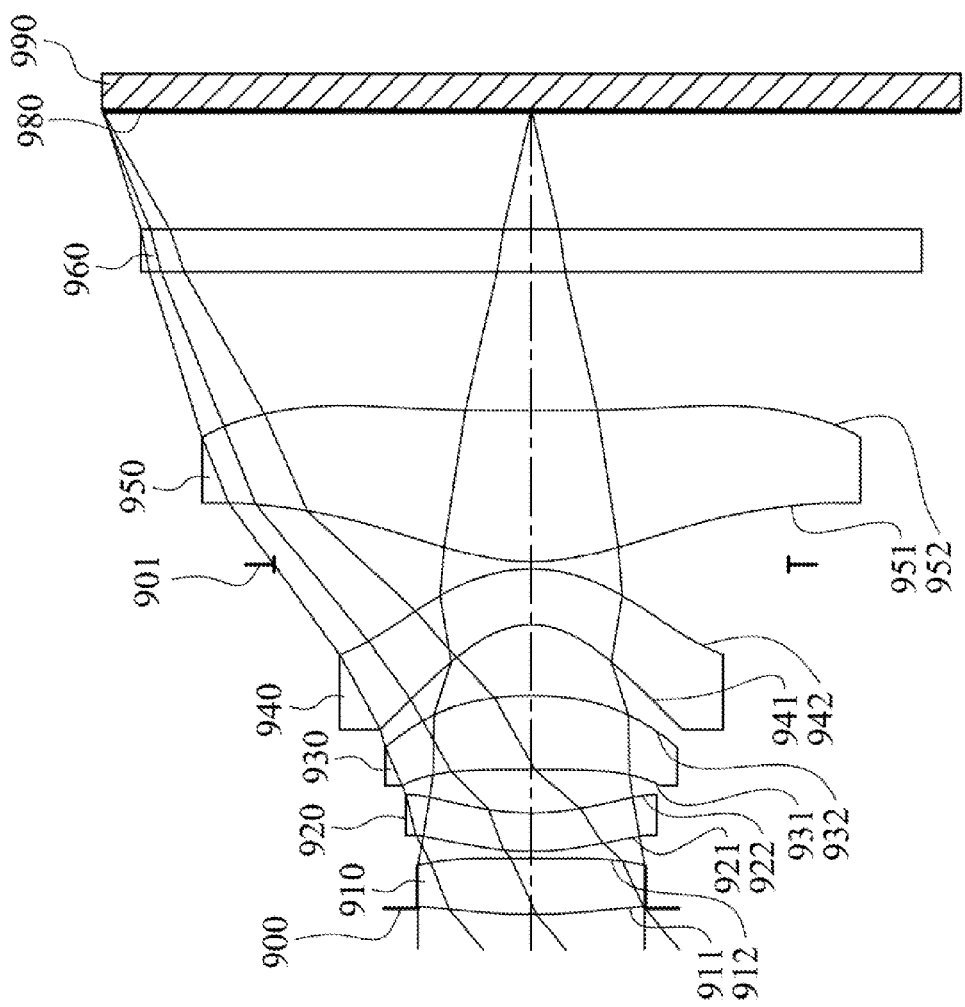
FIG. 17 is a schematic view of an image capturing device according to the 9th embodiment of the present disclosure.
Figure 18:
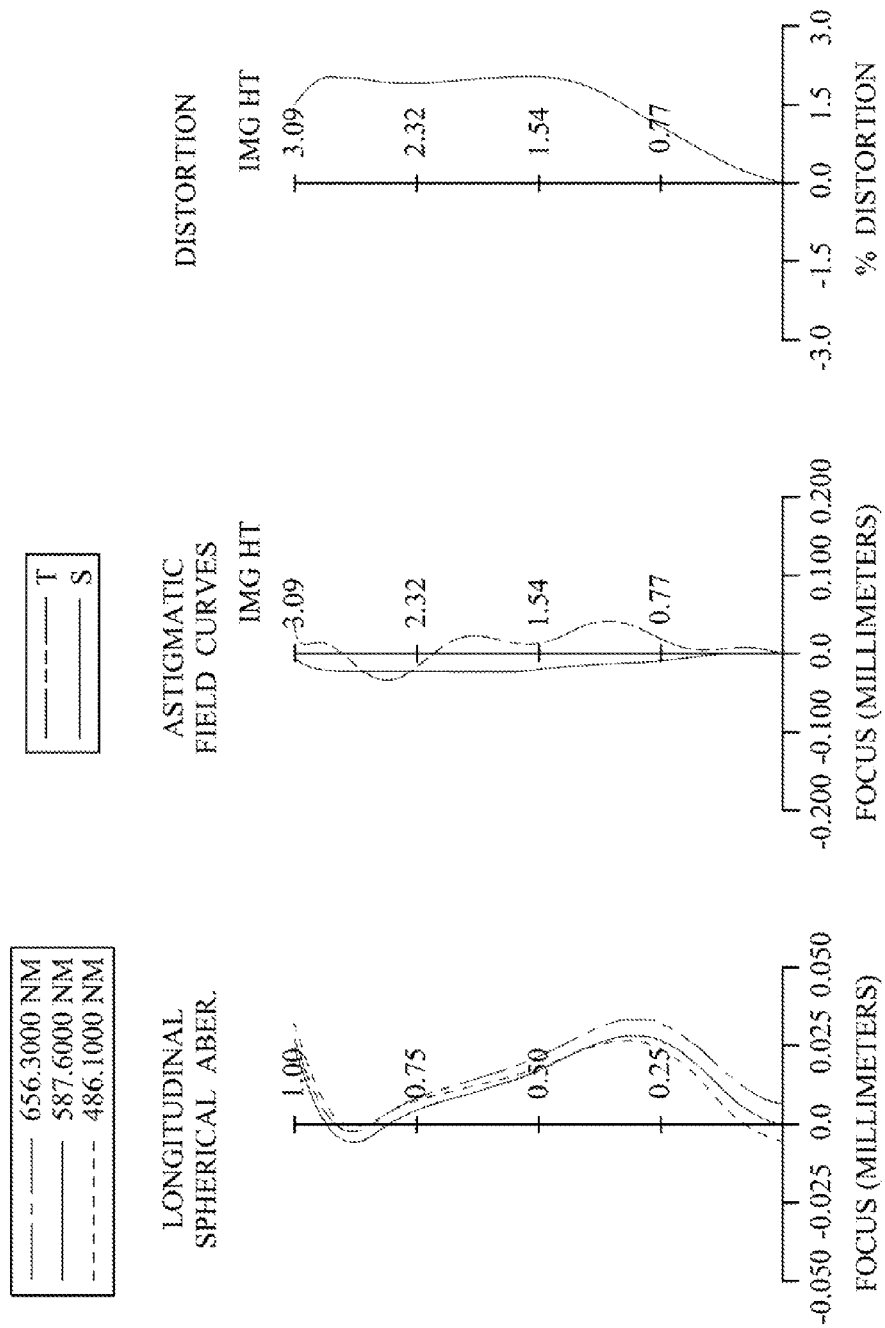
FIG. 18 shows, in order from left to right, spherical aberration curves, astigmatic field curves and a distortion curve of the image capturing device according to the 9th embodiment.

FIG. 17 is a schematic view of an image capturing device according to the 9th embodiment of the present disclosure. FIG. 18 shows, in order from left to right, spherical aberration curves, astigmatic field curves and a distortion curve of the image capturing device according to the 9th embodiment. In FIG. 17, the image capturing device includes an optical lens assembly and an image sensor 990. The optical lens assembly includes, in order from an object side to an image side, an aperture stop 900, a first lens element 910, a second lens element 920, a third lens element 930, a fourth lens element 940, a stop 901, a fifth lens element 950, an IR-cut filter 960 and an image plane 980, wherein the image sensor 990 is disposed on the image plane 980, and the optical lens assembly has a total of five lens elements (910-950) with refractive power.

The first lens element 910 with positive refractive power has an object-side surface 911 being convex in a paraxial region thereof and an image-side surface 912 being planar in a paraxial region thereof. The first lens element 910 is made of glass material, and the object-side surface 911 and the image-side surface 912 of the first lens element 910 are aspheric.

The second lens element 920 with negative refractive power has an object-side surface 921 being convex in a paraxial region thereof and an image-side surface 922 being concave in a paraxial region thereof. The second lens element 920 is made of plastic material, and the object-side surface 921 and the image-side surface 922 of the second lens element 920 are aspheric. Furthermore, both of the object-side surface 921 and the image-side surface 922 of the second lens element 920 have at least one inflection point.

The third lens element 930 with positive refractive power has an object-side surface 931 being planar in a paraxial region thereof and an image-side surface 932 being convex in a paraxial region thereof. The third lens element 930 is made of plastic material, and the object-side surface 931 and the image-side surface 932 of the third lens element 930 are aspheric. Furthermore, both of the object-side surface 931 and the image-side surface 932 of the third lens element 930 have at least one inflection point.

The fourth lens element 940 with negative refractive power has an object-side surface 941 being concave in a paraxial region thereof and an image-side surface 942 being convex in a paraxial region thereof. The fourth lens element 940 is made of plastic material, and the object-side surface 941 and the image-side surface 942 of the fourth lens element 940 are aspheric. Furthermore, the image-side surface 942 of the fourth lens element 940 has at least one inflection point.

The fifth lens element 950 with positive refractive power has an object-side surface 951 being convex in a paraxial region thereof and an image-side surface 952 being convex in a paraxial region thereof. The fifth lens element 950 is made of plastic material, and the object-side surface 951 and the image-side surface 952 of the fifth lens element 950 are aspheric. The image-side surface 952 of the fifth lens element 950 has at least one convex shape in an off-axis region thereof. Furthermore, both of the object-side surface 951 and the image-side surface 952 of the fifth lens element 950 have at least one inflection point in the off-axis region thereof.

The IR-cut filter 960 is made of glass and located between the fifth lens element 950 and the image plane 980, and will not affect the focal length of the optical lens assembly.

The detailed optical data of the 9th embodiment are shown in Table 17 and the aspheric surface data are shown in Table 18 below.

TABLE 17

9th Embodiment
f = 3.64 mm, Fno = 2.23, HFOV = 39.9 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.043 | | | | |
| 2 | Lens 1 | 4.517 | ASP | 0.398 | Glass | 1.542 | 62.9 | 8.33 |
| 3 | | ∞ | ASP | 0.050 | | | | |
| 4 | Lens 2 | 1.906 | ASP | 0.280 | Plastic | 1.650 | 21.4 | −280.12 |
| 5 | | 1.777 | ASP | 0.313 | | | | |
| 6 | Lens 3 | ∞ | ASP | 0.529 | Plastic | 1.544 | 55.9 | 4.29 |
| 7 | | −2.335 | ASP | 0.517 | | | | |
| 8 | Lens 4 | −0.540 | ASP | 0.397 | Plastic | 1.650 | 21.4 | −2.52 |
| 9 | | −1.040 | ASP | 0.030 | | | | |
| 10 | Stop | Plano | | 0.022 | | | | |
| 11 | Lens 5 | 1.537 | ASP | 1.092 | Plastic | 1.535 | 55.7 | 2.84 |
| 12 | | −100.000 | ASP | 1.000 | | | | |
| 13 | IR-cut filter | Plano | | 0.300 | Glass | 1.517 | 64.2 | — |
| 14 | | Plano | | 0.856 | | | | |
| 15 | Image | Plano | | — | | | | |

Note:
Reference wavelength (d-line) is 587.6 nm.
The effective radius of the surface 10 is 1.850 mm.

TABLE 18

Aspheric Coefficients

| | | | Surface # | | |
|---|---|---|---|---|---|
| | 2 | 3 | 4 | 5 | 6 |
| k = | 3.8049E+00 | −1.0000E+00 | −2.4888E+01 | −3.6448E+00 | −1.0000E+00 |
| A4 = | −1.8755E−02 | −8.9505E−02 | 2.5547E−01 | −8.6338E−02 | −1.4898E−01 |
| A6 = | 3.4819E−02 | 6.5767E−02 | −8.5093E−01 | 6.0525E−02 | 1.2475E−01 |
| A8 = | −3.9486E−01 | −2.5002E−01 | 2.0224E+00 | −4.9000E−02 | −5.8628E−01 |
| A10 = | 9.5118E−01 | 2.1751E−01 | −3.6307E+00 | −1.9710E−01 | 1.1931E+00 |
| A12 = | −1.3777E+00 | −1.7127E−01 | 3.9348E+00 | 3.3178E−01 | −1.4055E+00 |
| A14 = | 1.0455E+00 | 1.5965E−01 | −2.3149E+00 | −2.5756E−01 | 9.0323E−01 |
| A16 = | −3.4628E−01 | −7.2472E−02 | 5.5838E−01 | 8.3268E−02 | −2.2306E−01 |

| | | | Surface # | | |
|---|---|---|---|---|---|
| | 7 | 8 | 9 | 11 | 12 |
| k = | −3.7022E+00 | −1.4479E+00 | −1.0527E+00 | −1.3936E+00 | −9.0000E+01 |
| A4 = | −1.7671E−01 | 1.4944E−01 | 1.3273E−01 | −1.4954E−01 | 6.7126E−02 |
| A6 = | 1.2162E−01 | −6.2256E−01 | −2.5646E−01 | 8.9353E−02 | −5.9172E−02 |
| A8 = | −2.8731E−01 | 1.2257E+00 | 3.4140E−01 | −4.2885E−02 | 2.6795E−02 |
| A10 = | 3.3174E−01 | −1.2185E+00 | −2.0799E−01 | 1.3198E−02 | −8.1405E−03 |
| A12 = | −1.0808E−01 | 7.5354E−01 | 6.1578E−02 | −2.3578E−03 | 1.5662E−03 |
| A14 = | −4.6430E−02 | −3.0304E−01 | −7.0544E−03 | 2.2171E−04 | −1.6697E−04 |
| A16 = | 3.0851E−02 | 5.6955E−02 | −2.8211E−05 | −8.4599E−06 | 7.3796E−06 |

In the 9th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 9th embodiment, so an explanation in this regard will not be provided again.

Moreover, these parameters can be calculated from Table 17 and Table 18 as the following values and satisfy the following conditions:

| 9th embodiment | | | |
|---|---|---|---|
| f [mm] | 3.64 | f/f2 | −0.01 |
| Fno | 2.23 | f/f4 | −1.44 |
| HFOV [deg.] | 39.9 | f3/f1 | 0.52 |

-continued

| 9th embodiment | | | |
|---|---|---|---|
| (SAG31 + SAG32)/CT3 | −0.91 | f2/f5 | −98.63 |
| Z51/ΣAT | — | f3/f5 | 1.51 |
| f/R1 | 0.81 | |f/f4| + (f/f5) | 2.73 |
| f/(|R7| + |R8|) | 2.30 | | |

10th Embodiment

Figure 19:
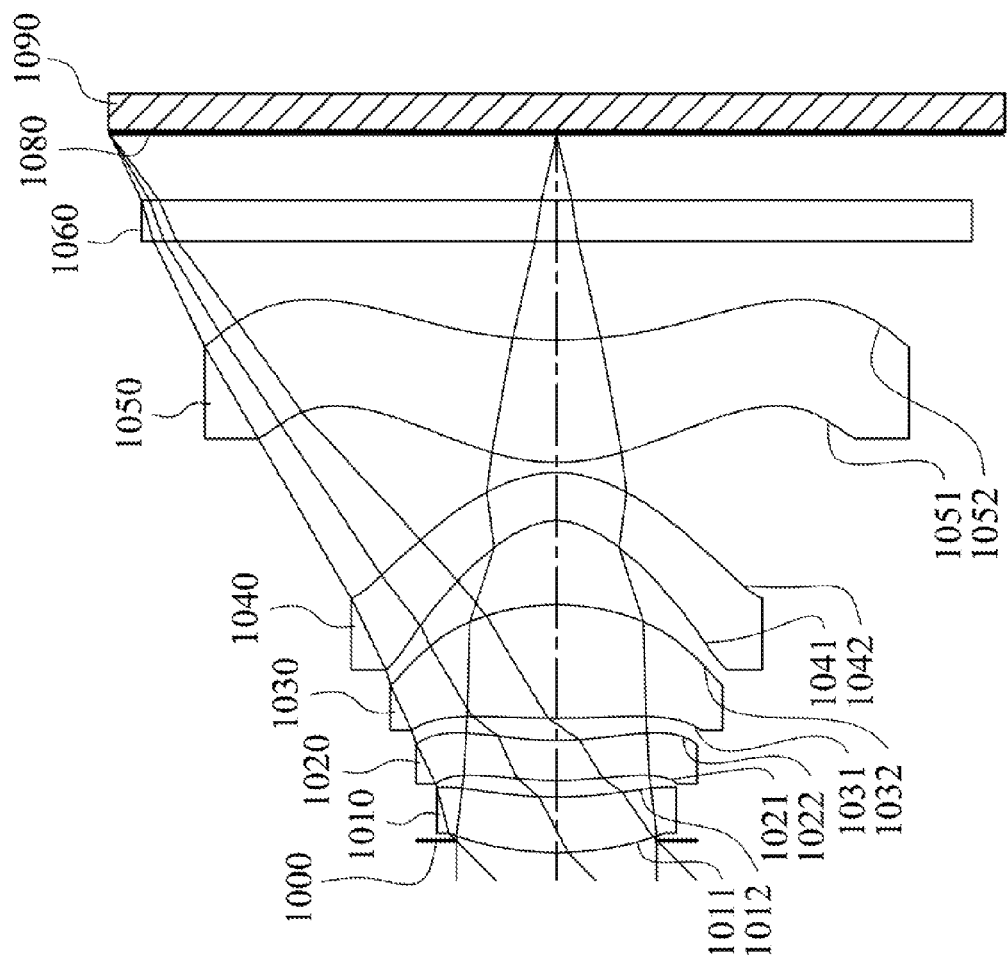
FIG. 19 is a schematic view of an image capturing device according to the 10th embodiment of the present disclosure.
Figure 20:
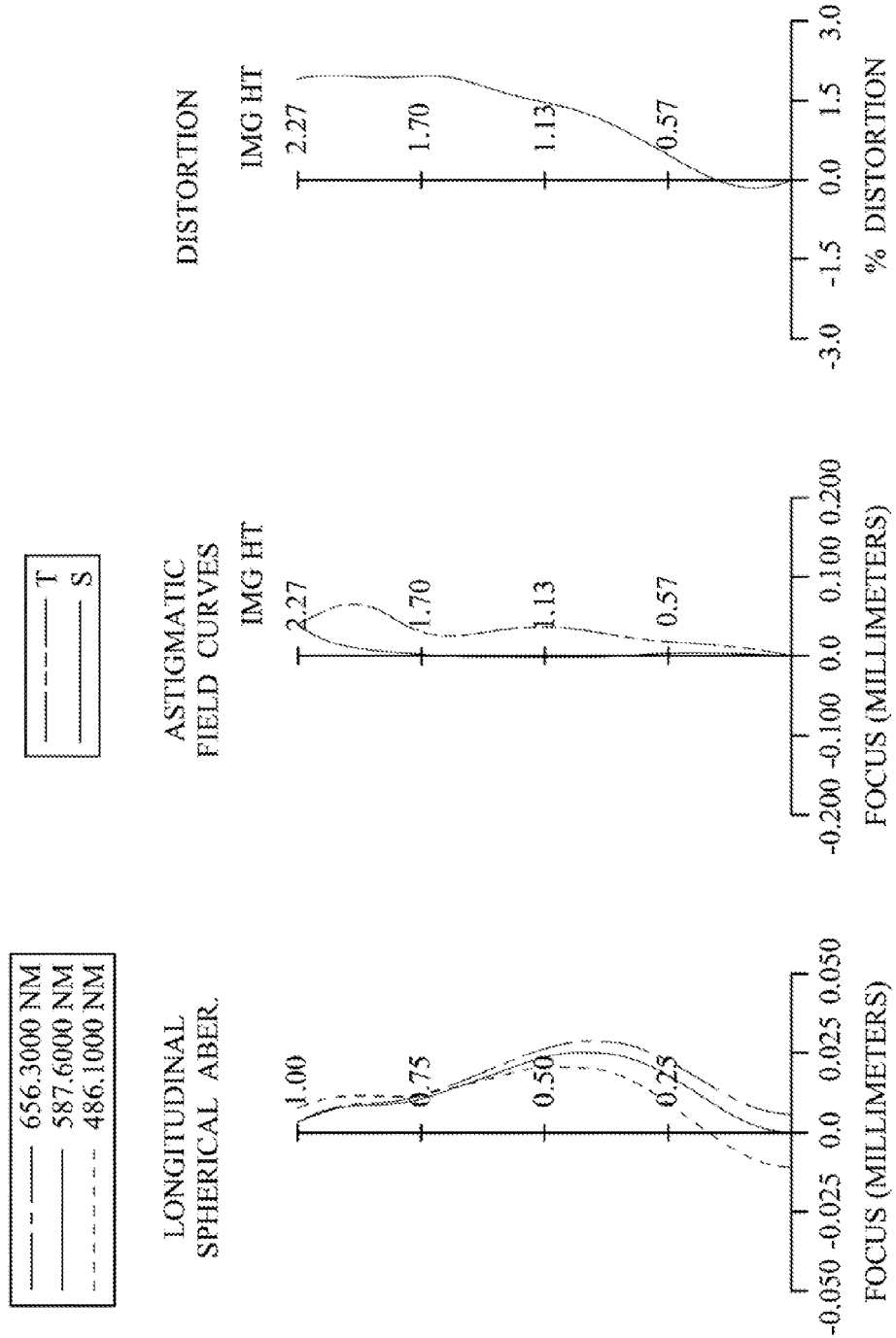
FIG. 20 shows, in order from left to right, spherical aberration curves, astigmatic field curves and a distortion curve of the image capturing device according to the 10th embodiment.

FIG. 19 is a schematic view of an image capturing device according to the 10th embodiment of the present disclosure. FIG. 20 shows, in order from left to right, spherical aberration curves, astigmatic field curves and a distortion curve of the image capturing device according to the 10th embodiment. In FIG. 19, the image capturing device includes an optical lens assembly and an image sensor 1090. The optical lens assembly includes, in order from an object side to an image side, an aperture stop 1000, a first lens element 1010, a second lens element 1020, a third lens element 1030, a fourth lens element 1040, a fifth lens element 1050, an IR-cut filter 1060 and an image plane 1080, wherein the image sensor 1090 is disposed on the image plane 1080, and the optical lens assembly has a total of five lens elements (1010-1050) with refractive power.

The first lens element 1010 with positive refractive power has an object-side surface 1011 being convex in a paraxial region thereof and an image-side surface 1012 being concave in a paraxial region thereof. The first lens element 1010 is made of plastic material, and the object-side surface 1011 and the image-side surface 1012 of the first lens element 1010 are aspheric.

The second lens element 1020 with negative refractive power has an object-side surface 1021 being convex in a paraxial region thereof and an image-side surface 1022 being concave in a paraxial region thereof. The second lens element 1020 is made of plastic material, and the object-side surface 1021 and the image-side surface 1022 of the second lens element 1020 are aspheric. Furthermore, both of the object-side surface 1021 and the image-side surface 1022 of the second lens element 1020 have at least one inflection point.

The third lens element 1030 with positive refractive power has an object-side surface 1031 being convex in a paraxial region thereof and an image-side surface 1032 being convex in a paraxial region thereof. The third lens element 1030 is made of plastic material, and the object-side surface 1031 and the image-side surface 1032 of the third lens element 1030 are aspheric. Furthermore, both of the object-side surface 1031 and the image-side surface 1032 of the third lens element 1030 have at least one inflection point.

The fourth lens element 1040 with negative refractive power has an object-side surface 1041 being concave in a paraxial region thereof and an image-side surface 1042 being convex in a paraxial region thereof. The fourth lens element 1040 is made of plastic material, and the object-side surface 1041 and the image-side surface 1042 of the fourth lens element 1040 are aspheric. Furthermore, both of the object-side surface 1041 and the image-side surface 1042 of the fourth lens element 1040 have at least one inflection point.

The fifth lens element 1050 with positive refractive power has an object-side surface 1051 being convex in a paraxial region thereof and an image-side surface 1052 being concave in a paraxial region thereof. The fifth lens element 1050 is made of plastic material, and the object-side surface 1051 and the image-side surface 1052 of the fifth lens element 1050 are aspheric. The image-side surface 1052 of the fifth lens element 1050 has at least one convex shape in an off-axis region thereof. Furthermore, both of the object-side surface 1051 and the image-side surface 1052 of the fifth lens element 1050 have at least one inflection point in the off-axis region thereof.

The IR-cut filter 1060 is made of glass and located between the fifth lens element 1050 and the image plane 1080, and will not affect the focal length of the optical lens assembly.

The detailed optical data of the 10th embodiment are shown in Table 19 and the aspheric surface data are shown in Table 20 below.

TABLE 19

10th Embodiment
f = 2.23 mm, Fno = 2.20, HFOV = 44.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.059 | | | | |
| 2 | Lens 1 | 1.567 | ASP | 0.281 | Plastic | 1.570 | 57.0 | 12.93 |
| 3 | | 1.860 | ASP | 0.084 | | | | |
| 4 | Lens 2 | 1.711 | ASP | 0.200 | Plastic | 1.660 | 20.0 | −54.19 |
| 5 | | 1.557 | ASP | 0.113 | | | | |
| 6 | Lens 3 | 4.771 | ASP | 0.574 | Plastic | 1.570 | 57.0 | 1.75 |
| 7 | | −1.203 | ASP | 0.429 | | | | |
| 8 | Lens 4 | −0.314 | ASP | 0.245 | Plastic | 1.660 | 20.0 | −2.21 |
| 9 | | −0.524 | ASP | 0.050 | | | | |
| 10 | Lens 5 | 0.965 | ASP | 0.621 | Plastic | 1.540 | 59.0 | 2.76 |
| 11 | | 2.123 | ASP | 0.500 | | | | |
| 12 | IR-cut filter | Plano | | 0.210 | Glass | 1.517 | 64.2 | — |
| 13 | | Plano | | 0.341 | | | | |
| 14 | Image | Plano | | — | | | | |

Note:
Reference wavelength (d-line) is 587.6 nm.

TABLE 20

Aspheric Coefficients

| | Surface # | | | | |
|---|---|---|---|---|---|
| | 2 | 3 | 4 | 5 | 6 |
| k = | 4.4056E+00 | −2.1578E+01 | −3.9409E+01 | −1.0596E+01 | 3.1781E+01 |
| A4 = | −1.9631E−01 | −6.8799E−02 | −1.0971E−01 | −4.8735E−01 | −3.2441E−01 |
| A6 = | 2.9566E−01 | 3.2622E−01 | −2.2118E+00 | 2.6439E−01 | 1.2304E−01 |
| A8 = | −2.4934E+00 | −1.5943E+00 | 9.9105E+00 | −6.8266E−02 | −2.6129E+00 |

TABLE 20-continued

| Aspheric Coefficients | | | | |
|---|---|---|---|---|
| A10 = | 6.0880E+00 | 1.5227E+00 | −3.0836E+01 | −2.0989E+00 | 9.3494E+00 |
| A12 = | −1.5759E+01 | −5.4829E+00 | 4.6295E+01 | 3.2044E+00 | −1.8141E+01 |
| A14 = | 2.0932E+01 | 3.1964E+00 | −4.9792E+01 | −5.7311E+00 | 1.7754E+01 |
| A16 = | −1.0994E+01 | −2.3009E+00 | 1.6725E+01 | 5.0065E+00 | −8.0636E+00 |

| | Surface # | | | | |
|---|---|---|---|---|---|
| | 7 | 8 | 9 | 10 | 11 |
| k = | −5.6826E+00 | −1.7837E+00 | −1.2000E+00 | −3.3716E+00 | −9.0000E+01 |
| A4 = | −4.6199E−01 | 1.8920E−01 | 1.1925E+00 | −7.3764E−02 | 4.4864E−01 |
| A6 = | 4.0863E−01 | −2.0424E+00 | −3.6845E+00 | 8.1574E−02 | −7.1997E−01 |
| A8 = | −1.5058E+00 | −2.1459E+00 | 5.6150E+00 | −2.7659E−01 | 5.7691E−01 |
| A10 = | 2.3853E+00 | 3.0699E+01 | −3.3381E+00 | 3.3835E−01 | −2.8020E−01 |
| A12 = | −1.5706E+00 | −7.5000E+01 | −9.3155E−01 | −2.0858E−01 | 8.0845E−02 |
| A14 = | −7.8929E−01 | 7.7224E+01 | 1.9507E+00 | 6.2582E−02 | −1.2806E−02 |
| A16 = | 1.8075E+00 | −2.9107E+01 | −5.9756E−01 | −7.1680E−03 | 8.6503E−04 |

In the 10th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 10th embodiment, so an explanation in this regard will not be provided again.

Moreover, these parameters can be calculated from Table 19 and Table 20 as the following values and satisfy the following conditions:

| 10th embodiment | | | |
|---|---|---|---|
| f [mm] | 2.23 | f/f2 | −0.04 |
| Fno | 2.20 | f/f4 | −1.01 |
| HFOV [deg.] | 44.8 | f3/f1 | 0.14 |
| (SAG31 + SAG32)/CT3 | −0.81 | f2/f5 | −19.63 |
| Z51/ΣAT | 0.42 | f3/f5 | 0.63 |
| f/R1 | 1.42 | |f/f4| + (f/f5) | 1.82 |
| f/(|R7| + |R8|) | 2.66 | | |

11th Embodiment

Figure 21:
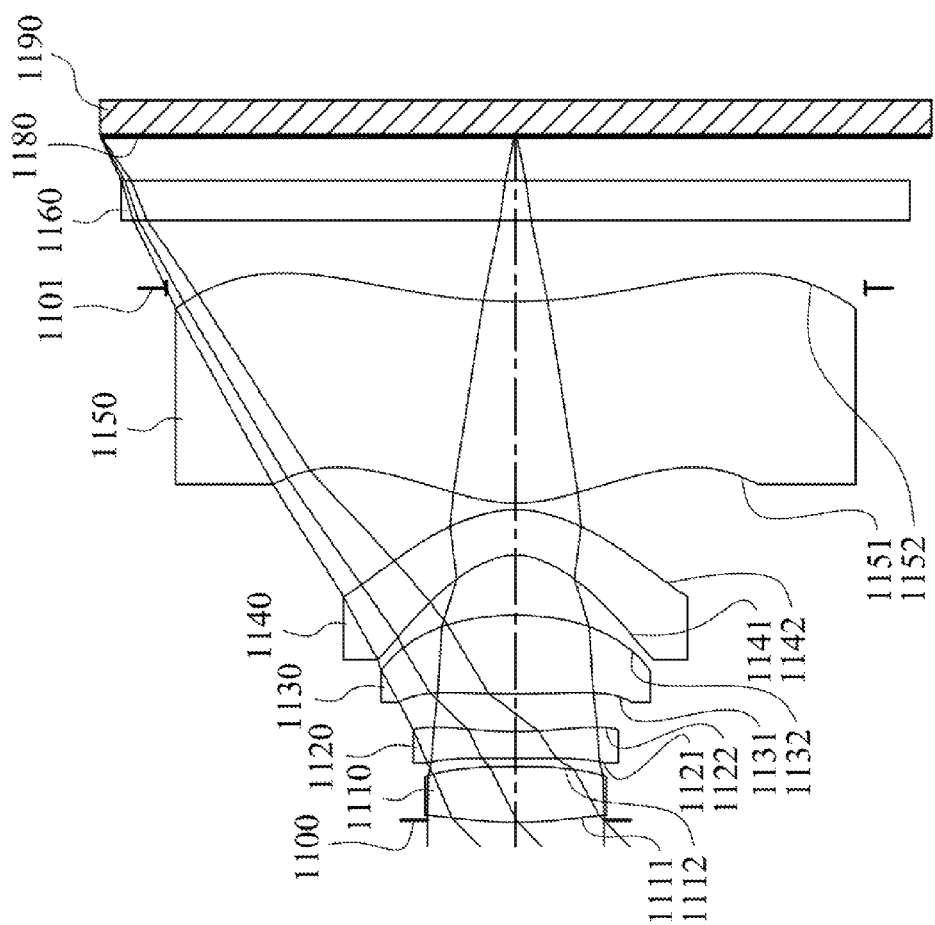
FIG. 21 is a schematic view of an image capturing device according to the 11th embodiment of the present disclosure.
Figure 22:
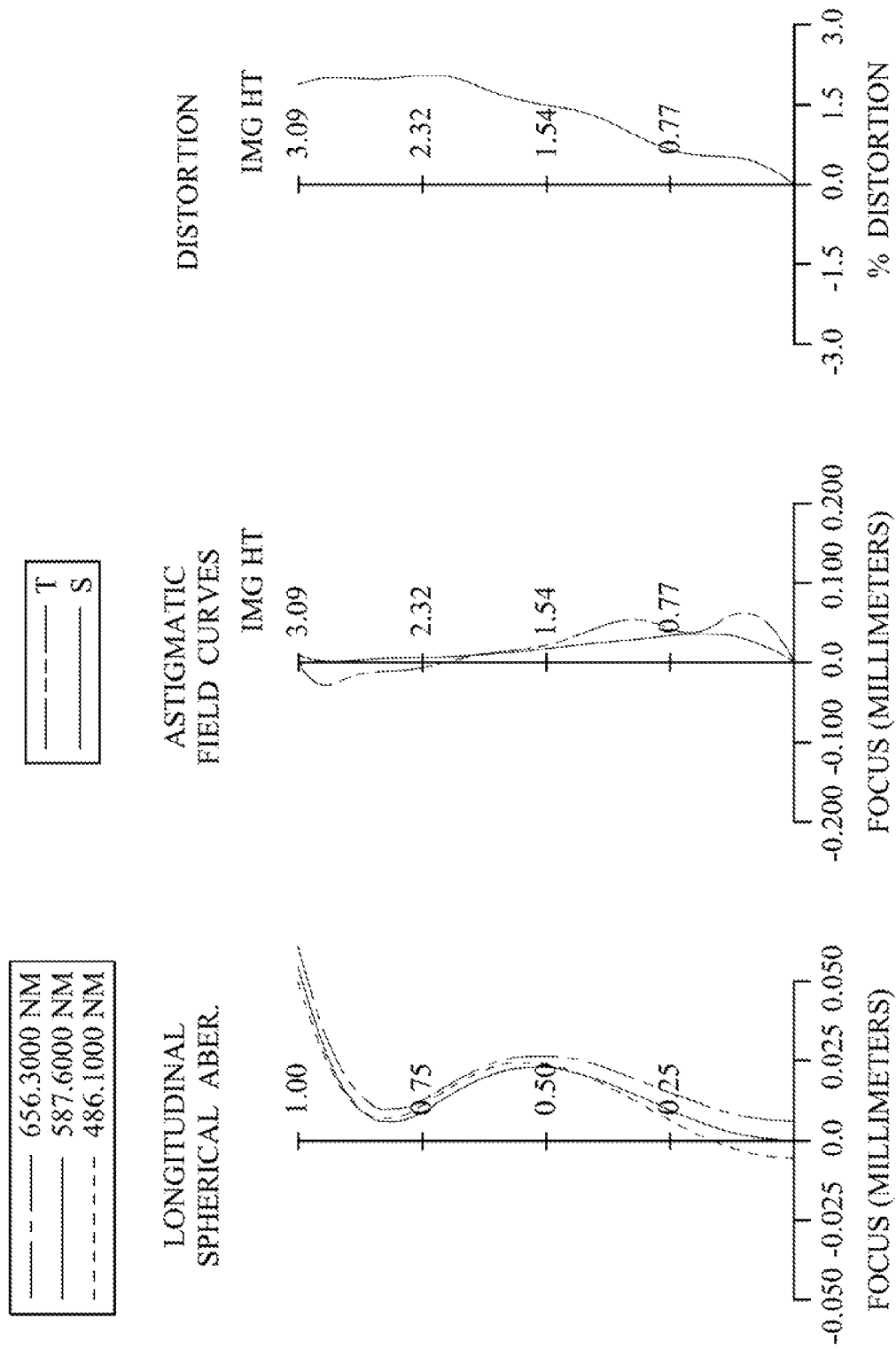
FIG. 22 shows, in order from left to right, spherical aberration curves, astigmatic field curves and a distortion curve of the image capturing device according to the 11th embodiment.

FIG. 21 is a schematic view of an image capturing device according to the 11th embodiment of the present disclosure. FIG. 22 shows, in order from left to right, spherical aberration curves, astigmatic field curves and a distortion curve of the image capturing device according to the 11th embodiment. In FIG. 21, the image capturing device includes an optical lens assembly and an image sensor 1190. The optical lens assembly includes, in order from an object side to an image side, an aperture stop 1100, a first lens element 1110, a second lens element 1120, a third lens element 1130, a fourth lens element 1140, a fifth lens element 1150, a stop 1101, an IR-cut filter 1160 and an image plane 1180, wherein the image sensor 1190 is disposed on the image plane 1180, and the optical lens assembly has a total of five lens elements (1110-1150) with refractive power.

The first lens element 1110 with positive refractive power has an object-side surface 1111 being convex in a paraxial region thereof and an image-side surface 1112 being convex in a paraxial region thereof. The first lens element 1110 is made of plastic material, and the object-side surface 1111 and the image-side surface 1112 of the first lens element 1110 are aspheric.

The second lens element 1120 with negative refractive power has an object-side surface 1121 being concave in a paraxial region thereof and an image-side surface 1122 being concave in a paraxial region thereof. The second lens element 1120 is made of plastic material, and the object-side surface 1121 and the image-side surface 1122 of the second lens element 1120 are aspheric. Furthermore, the image-side surface 1122 of the second lens element 1120 has at least one inflection point.

The third lens element 1130 with positive refractive power has an object-side surface 1131 being convex in a paraxial region thereof and an image-side surface 1132 being convex in a paraxial region thereof. The third lens element 1130 is made of plastic material, and the object-side surface 1131 and the image-side surface 1132 of the third lens element 1130 are aspheric. Furthermore, both of the object-side surface 1131 and the image-side surface 1132 of the third lens element 1130 have at least one inflection point.

The fourth lens element 1140 with negative refractive power has an object-side surface 1141 being concave in a paraxial region thereof and an image-side surface 1142 being convex in a paraxial region thereof. The fourth lens element 1140 is made of plastic material, and the object-side surface 1141 and the image-side surface 1142 of the fourth lens element 1140 are aspheric. Furthermore, both of the object-side surface 1141 and the image-side surface 1142 of the fourth lens element 1140 have at least one inflection point.

The fifth lens element 1150 with positive refractive power has an object-side surface 1151 being convex in a paraxial region thereof and an image-side surface 1152 being concave in a paraxial region thereof. The fifth lens element 1150 is made of plastic material, and the object-side surface 1151 and the image-side surface 1152 of the fifth lens element 1150 are aspheric. The image-side surface 1152 of the fifth lens element 1150 has at least one convex shape in an off-axis region thereof. Furthermore, both of the object-side surface 1151 and the image-side surface 1152 of the fifth lens element 1150 have at least one inflection point in the off-axis region thereof.

The IR-cut filter 1160 is made of glass and located between the fifth lens element 1150 and the image plane 1180, and will not affect the focal length of the optical lens assembly.

The detailed optical data of the 11th embodiment are shown in Table 21 and the aspheric surface data are shown in Table 22 below.

TABLE 21

11th Embodiment
f = 3.15 mm, Fno = 2.40, HFOV = 43.8 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Ape. Stop | Plano | | −0.016 | | | | |
| 2 | Lens 1 | 3.224 | ASP | 0.414 | Plastic | 1.544 | 55.9 | 3.47 |
| 3 | | −4.363 | ASP | 0.061 | | | | |
| 4 | Lens 2 | −100.000 | ASP | 0.200 | Plastic | 1.544 | 55.9 | −5.44 |
| 5 | | 3.054 | ASP | 0.276 | | | | |
| 6 | Lens 3 | 7.723 | ASP | 0.590 | Plastic | 1.544 | 55.9 | 2.89 |
| 7 | | −1.923 | ASP | 0.448 | | | | |
| 8 | Lens 4 | −0.423 | ASP | 0.337 | Plastic | 1.650 | 21.4 | −2.22 |
| 9 | | −0.787 | ASP | 0.050 | | | | |
| 10 | Lens 5 | 1.230 | ASP | 1.500 | Plastic | 1.530 | 55.8 | 2.96 |
| 11 | | 3.302 | ASP | 0.100 | | | | |
| 12 | Stop | Plano | | 0.500 | | | | |
| 13 | IR-cut filter | Plano | | 0.300 | Glass | 1.517 | 64.2 | — |
| 14 | | Plano | | 0.329 | | | | |
| 15 | Image | Plano | | — | | | | |

Note:
Reference wavelength (d-line) is 587.6 nm.
The effective radius of the surface 12 is 2.600 mm.

TABLE 22

Aspheric Coefficients

| | | | Surface # | | |
|---|---|---|---|---|---|
| | 2 | 3 | 4 | 5 | 6 |
| k = | 1.8234E+00 | 2.5542E+01 | 9.0000E+01 | −1.1097E+01 | 5.8291E+01 |
| A4 = | −4.6418E−02 | 8.6174E−02 | 8.9760E−03 | −1.3300E−01 | −1.3250E−01 |
| A6 = | −3.3305E−02 | −3.6016E−01 | −6.9255E−01 | −1.0353E−01 | 7.2326E−02 |
| A8 = | −3.2042E−01 | 4.0509E−02 | 1.6305E+00 | 3.4046E−02 | −6.0207E−01 |
| A10 = | 9.3591E−01 | 3.5824E−01 | −3.6789E+00 | −1.9899E−01 | 1.1297E+00 |
| A12 = | −1.7078E+00 | −4.6075E−01 | 4.3333E+00 | 2.4165E−01 | −1.4845E+00 |
| A14 = | 1.0455E+00 | 1.5965E−01 | −2.1526E+00 | −2.9314E−01 | 9.0415E−01 |
| A16 = | −3.4628E−01 | −7.2472E−02 | −1.3682E−02 | 1.7832E−01 | −1.6651E−01 |

| | | | Surface # | | |
|---|---|---|---|---|---|
| | 7 | 8 | 9 | 10 | 11 |
| k = | −1.8441E+01 | −1.8903E+00 | −1.3341E+00 | −2.4337E+00 | −9.0000E+01 |
| A4 = | −3.2898E−01 | 5.3540E−01 | 6.6899E−01 | −2.1138E−01 | 9.8346E−02 |
| A6 = | 2.9695E−01 | −3.1882E+00 | −1.7667E+00 | 1.7025E−01 | −8.6893E−02 |
| A8 = | −6.8619E−01 | 6.7041E+00 | 2.4342E+00 | −1.1962E−01 | 3.7312E−02 |
| A10 = | 1.3601E+00 | −6.7127E+00 | −1.8418E+00 | 6.0351E−02 | −9.5503E−03 |
| A12 = | −1.7723E+00 | 2.6566E+00 | 7.6862E−01 | −2.0074E−02 | 1.4310E−03 |
| A14 = | 1.1124E+00 | 2.3882E−01 | −1.6514E−01 | 3.7476E−03 | −1.1596E−04 |
| A16 = | −2.3868E−01 | −3.0495E−01 | 1.4897E−02 | −2.8793E−04 | 3.9333E−06 |

In the 11th embodiment, the equation of the aspheric surface profiles of the aforementioned lens elements is the same as the equation of the 1st embodiment. Also, the definitions of these parameters shown in the following table are the same as those stated in the 1st embodiment with corresponding values for the 11th embodiment, so an explanation in this regard will not be provided again.

Moreover, these parameters can be calculated from Table 21 and Table 22 as the following values and satisfy the following conditions:

| 11th embodiment | | | |
|---|---|---|---|
| f [mm] | 3.15 | f/f2 | −0.58 |
| Fno | 2.40 | f/f4 | −1.42 |
| HFOV [deg.] | 43.8 | f3/f1 | 0.83 |

-continued

| 11th embodiment | | | |
|---|---|---|---|
| (SAG31 + SAG32)/CT3 | −0.80 | f2/f5 | −1.84 |
| Z51/ΣAT | 0.31 | f3/f5 | 0.98 |
| f/R1 | 0.98 | |f/f4| + (f/f5) | 2.48 |
| f/(|R7| + |R8|) | 2.60 | | |

12th Embodiment

Figure 25:
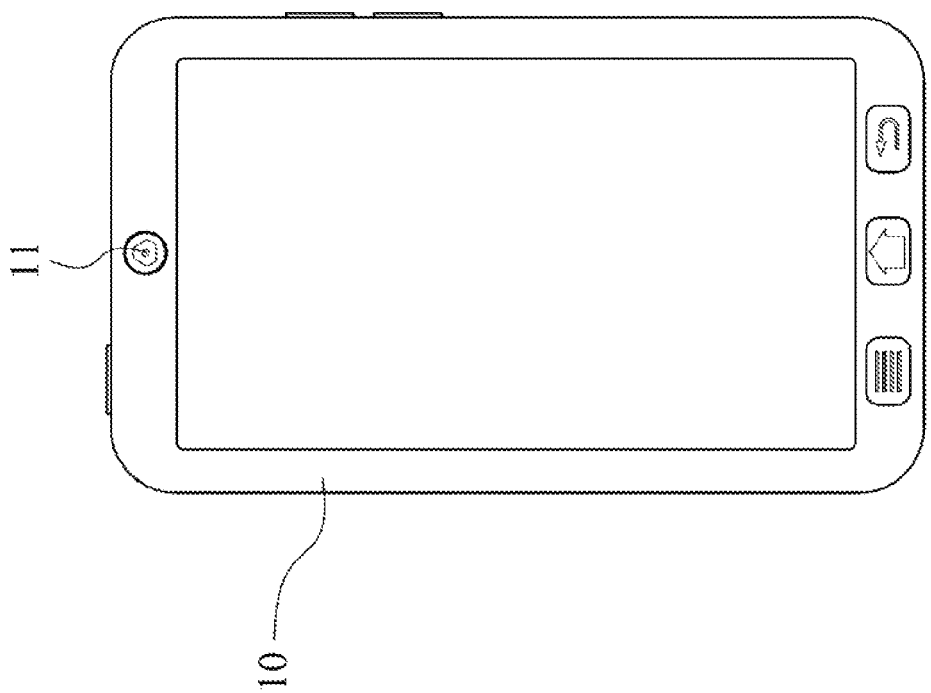
FIG. 25 is a schematic view of a mobile terminal according to the 12th embodiment of the present disclosure.

FIG. 25 is a schematic view of a mobile terminal 10 according to the 12th embodiment of the present disclosure. The mobile terminal 10 of the 12th embodiment is a smart phone, wherein the mobile terminal 10 includes an image capturing device 11. The image capturing device 11 includes an optical lens assembly (not otherwise herein labeled) according to the

13th Embodiment

Figure 26:
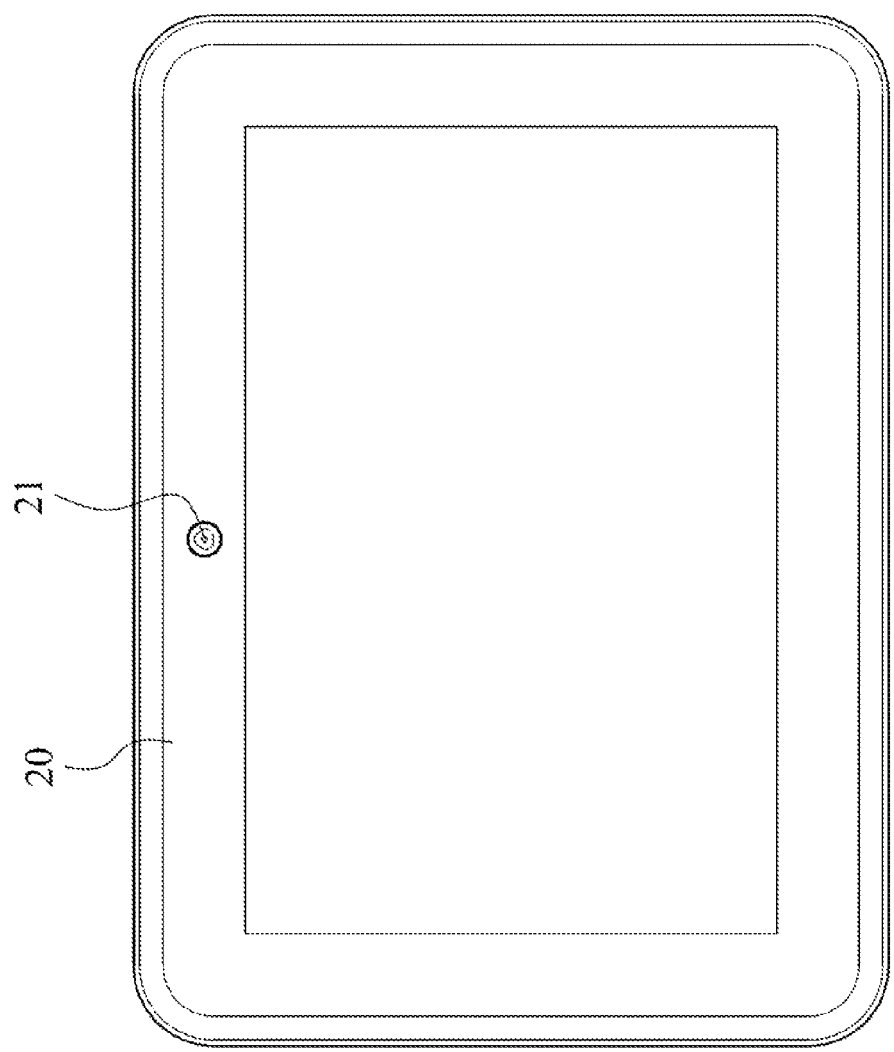
FIG. 26 is a schematic view of a mobile terminal according to the 13th embodiment of the present disclosure.

FIG. 26 is a schematic view of a mobile terminal 20 according to the 13th embodiment of the present disclosure. The mobile terminal 20 of the 13th embodiment is a tablet personal computer, wherein the mobile terminal 20 includes an image capturing device 21. The image capturing device 21 includes an optical lens assembly (not otherwise herein labeled) according to the present disclosure and an image sensor (not otherwise herein labeled), wherein the image sensor is disposed on or near an image plane of the optical lens assembly.

14th Embodiment

Figure 27:
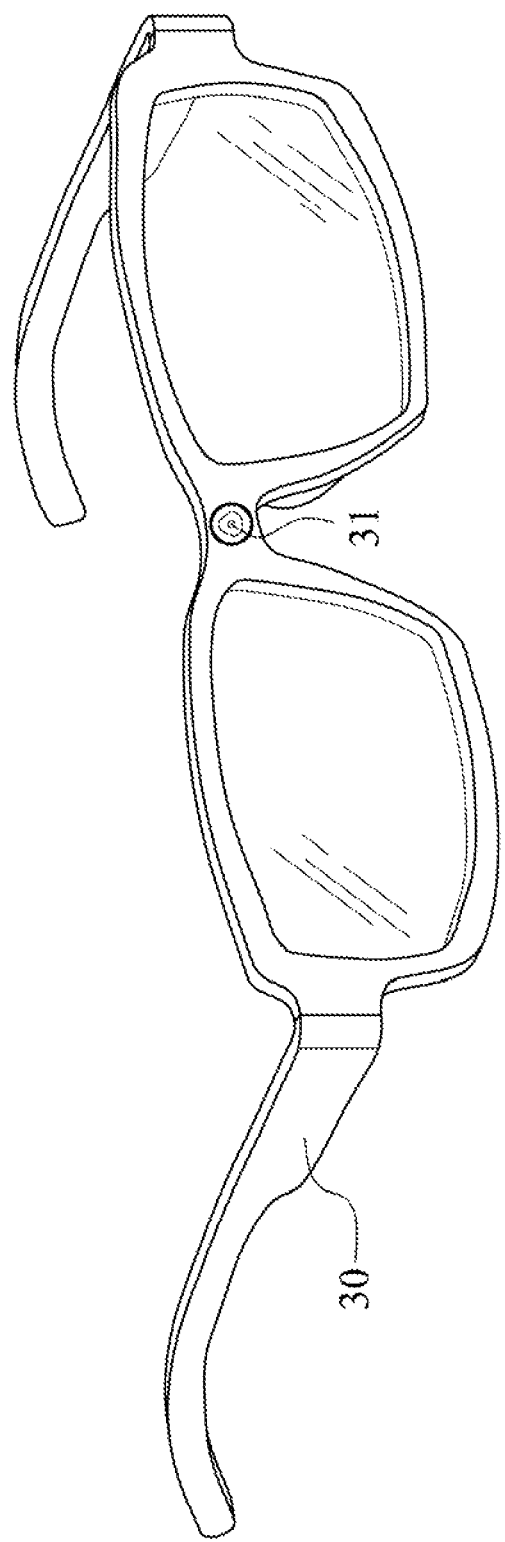
FIG. 27 is a schematic view of a mobile terminal according to the 14th embodiment of the present disclosure.

FIG. 27 is a schematic view of a mobile terminal 30 according to the 14th embodiment of the present disclosure. The mobile terminal 30 of the 14th embodiment is a head-mounted display, wherein the mobile terminal 30 includes an image capturing device 31. The image capturing device 31 includes an optical lens assembly (not otherwise herein labeled) according to the present disclosure and an image sensor (not otherwise herein labeled), wherein the image sensor is disposed on or near an image plane of the optical lens assembly.

The foregoing description, for purpose of explanation, has been described with reference to specific embodiments. It is to be noted that TABLES 1-22 show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical lens assembly comprising, in order from an object side to an image side:
   a first lens element with positive refractive power having an object-side surface being convex in a paraxial region thereof;
   a second lens element having negative refractive power;
   a third lens element having refractive power;
   a fourth lens element with negative refractive power having an object-side surface being concave in a paraxial region thereof and an image-side surface being convex in a paraxial region thereof, wherein the object-side surface and the image-side surface of the fourth lens element are aspheric; and
   a fifth lens element with positive refractive power having an object-side surface being convex in a paraxial region thereof and an image-side surface being concave in a paraxial region thereof, wherein the object-side surface and the image-side surface of the fifth lens element are aspheric, and the image-side surface of the fifth lens element has at least one convex shape in an off-axis region thereof;
   wherein the optical lens assembly has a total of five lens elements with refractive power, a focal length of the optical lens assembly is f, a focal length of the second lens element is f2, a focal length of the fourth lens element is f4, a focal length of the fifth lens element is f5, a distance in parallel with an optical axis from an axial vertex on an object-side surface of the third lens element to a maximum effective radius position on the object-side surface of the third lens element is SAG31, a distance in parallel with the optical axis from an axial vertex on an image-side surface of the third lens element to a maximum effective radius position on the image-side surface of the third lens element is SAG32, a central thickness of the third lens element is CT3, and the following conditions are satisfied:

$f2/f5 < -1.2$;

$1.50 \leq |f/f4| + (f/f5)$; and $(SAG31+SAG32)/CT3 < -0.65$.

2. The optical lens assembly of claim 1, wherein the third lens element has positive refractive power and has the image-side surface being convex in a paraxial region thereof.

3. The optical lens assembly of claim 2, wherein the focal length of the optical lens assembly is f, the focal length of the fourth lens element is f4, and the following condition is satisfied:

$f/f4 < -1.0$.

4. The optical lens assembly of claim 2, wherein a focal length of the first lens element is f1, a focal length of the third lens element is f3, and the following condition is satisfied:

$0.1 < f3/f1 < 1.0$.

5. The optical lens assembly of claim 2, wherein a focal length of the third lens element is f3, the focal length of the fifth lens element is f5, and the following condition is satisfied:

$0.6 < f3/f5 < 1.6$.

6. The optical lens assembly of claim 1, wherein the focal length of the second lens element is f2, the focal length of the fifth lens element is f5, and the following condition is satisfied:

$f2/f5 < -1.75$.

7. The optical lens assembly of claim 1, wherein the focal length of the optical lens assembly is f, the focal length of the fourth lens element is f4, the focal length of the fifth lens element is f5, and the following condition is satisfied:

$2.0 < |f/f4| + (f/f5) < 3.5$.

8. The optical lens assembly of claim 1, wherein a focal length of the first lens element is f1, the focal length of the second lens element is f2, a focal length of the third lens element is f3, the focal length of the fourth lens element is f4, and the following condition is satisfied:

$|f2| > —|fx|$, wherein $x=1,3,$ or $4$.

9. The optical lens assembly of claim 1, wherein the focal length of the optical lens assembly is f, a curvature radius of the object-side surface of the first lens element is R1, and the following condition is satisfied:

$0 < f/R1 < 1.45$.

10. The optical lens assembly of claim 1, wherein at least one of the second lens element, the third lens element and the fourth lens element has at least one inflection point.

11. The optical lens assembly of claim 1, wherein a distance in parallel with the optical axis from an axial vertex on the object-side surface of the fifth lens element to a critical point on the object-side surface of the fifth lens element which is closest to an image plane of the optical lens assembly is Z51, a total axial distance of intervals between each lens element adjacent to each other is ΣAT, and the following condition is satisfied:

$$0.18 \leq Z51/\Sigma AT < 0.50.$$

12. The optical lens assembly of claim 1, wherein the focal length of the optical lens assembly is f, a curvature radius of the object-side surface of the fourth lens element is R7, a curvature radius of the image-side surface of the fourth lens element is R8, and the following condition is satisfied:

$$1.7 < f/(|R7|+|R8|) < 4.0.$$

13. An image capturing device, comprising:
the optical lens assembly of claim 1; and
an image sensor, wherein the image sensor is located on the image side of the optical lens assembly.

14. A mobile terminal, comprising:
the image capturing device of claim 13.

15. An optical lens assembly comprising, in order from an object side to an image side:
a first lens element with positive refractive power having an object-side surface being convex in a paraxial region thereof;
a second lens element having negative refractive power;
a third lens element having refractive power;
a fourth lens element with negative refractive power having an object-side surface being concave in a paraxial region thereof and an image-side surface being convex in a paraxial region thereof, wherein the object-side surface and the image-side surface of the fourth lens element are aspheric; and
a fifth lens element with positive refractive power having an object-side surface and an image-side surface both being aspheric, wherein at least one of the object-side surface and the image-side surface of the fifth lens element has at least one inflection point in an off-axis region thereof;
wherein the optical lens assembly has a total of five lens elements with refractive power, a focal length of the optical lens assembly is f, a focal length of the second lens element is f2, a focal length of the fourth lens element is f4, a focal length of the fifth lens element is f5, and the following conditions are satisfied:

$$f2/f5 < -3.5; \text{ and}$$

$$1.50 \leq |f/f4| + (f/f5).$$

16. The optical lens assembly of claim 15, wherein the fifth lens element has the object-side surface being convex in a paraxial region thereof and the image-side surface being concave in a paraxial region thereof, and the image-side surface of the fifth lens element has a convex shape in the off-axis region thereof.

17. The optical lens assembly of claim 15, wherein the focal length of the optical lens assembly is f, the focal length of the second lens element is f2, and the following condition is satisfied;

$$-0.40 < f/f2 < 0.$$

18. The optical lens assembly of claim 15, wherein a distance in parallel with an optical axis from an axial vertex on the object-side surface of the fifth lens element to a critical point on the object-side surface of the fifth lens element which is closest to an image plane of the optical lens assembly is Z51, a total axial distance of intervals between each lens element adjacent to each other is ΣAT, and the following condition is satisfied:

$$0.18 \leq Z51/\Sigma AT < 0.50.$$

19. The optical lens assembly of claim 15, wherein the focal length of the optical lens assembly is f, the focal length of the fourth lens element is f4, and the following condition is satisfied:

$$f/f4 < -1.0.$$

20. The optical lens assembly of claim 15, wherein the focal length of the optical lens assembly is f, a curvature radius of the object-side surface of the fourth lens element is R7, a curvature radius of the image-side surface of the fourth lens element is R8, and the following condition is satisfied:

$$2.0 < f/(|R7|+|R8|) < 4.0.$$

21. An image capturing device, comprising:
the optical lens assembly of claim 15; and
an image sensor, wherein the image sensor is located on the image side of the optical lens assembly.

22. A mobile terminal, comprising:
the image capturing device of claim 21.

* * * * *

UNITED STATES PATENT AND TRADEMARK OFFICE
CERTIFICATE OF CORRECTION

| | |
|---|---|
| PATENT NO. | : 9,244,256 B2 |
| APPLICATION NO. | : 14/199990 |
| DATED | : January 26, 2016 |
| INVENTOR(S) | : Po-Lun Hsu et al. |

It is certified that error appears in the above-identified patent and that said Letters Patent is hereby corrected as shown below:

In the claims (1) In column 42, line 58, claim 8 reads as "$|f2| >\!\!-\!\!|fx|$, wherein x = 1, 3, or 4", but it should read as "$|f2| > |fx|$, wherein x = 1, 3, or 4".

Page 1 of 1

Signed and Sealed this
Ninth Day of August, 2016

Michelle K. Lee
*Director of the United States Patent and Trademark Office*